United States Patent
Nizri et al.

(10) Patent No.: US 7,092,716 B2
(45) Date of Patent: Aug. 15, 2006

(54) IDLE MODE HANDLING IN A HYBRID GSM/CDMA NETWORK

(75) Inventors: Shlomo Nizri, Kibbutz Hasolelim (IL); Michael Vakulenko, Haifa (IL); Atai Levy, Haifa (IL); Ron Nevo, Hillsboro, OR (US); Sergio Kolor, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 291 days.

(21) Appl. No.: 10/135,778

(22) Filed: Apr. 29, 2002

(65) Prior Publication Data

US 2002/0197992 A1 Dec. 26, 2002

Related U.S. Application Data

(62) Division of application No. 09/409,947, filed on Sep. 30, 1999, now abandoned.

(51) Int. Cl.
*H04Q 7/20* (2006.01)
(52) U.S. Cl. .......... 455/448; 455/67.13; 370/280; 370/281; 370/335; 370/336
(58) Field of Classification Search .......... 455/423, 455/436–444, 67.11–67.16, 445–449, 509–517; 370/331–337, 277–281
See application file for complete search history.

(56) References Cited

U.S. PATENT DOCUMENTS

| | | | | |
|---|---|---|---|---|
| 5,917,811 | A | * | 6/1999 | Weaver et al. ............. 370/332 |
| 5,978,679 | A | * | 11/1999 | Agre ......................... 455/442 |
| 5,999,816 | A | * | 12/1999 | Tiedemann et al. ........ 455/437 |
| 6,088,590 | A | * | 7/2000 | Anderson et al. .......... 455/437 |
| 6,115,608 | A | * | 9/2000 | Duran et al. ............... 455/436 |
| 6,304,755 | B1 | * | 10/2001 | Tiedemann et al. ........ 455/437 |
| 6,654,362 | B1 | * | 11/2003 | Palamara .................... 370/332 |

* cited by examiner

*Primary Examiner*—Charles Craver
(74) *Attorney, Agent, or Firm*—Philip R. Wadsworth; Sandip S. Minhas; Albert J. Harnois

(57) ABSTRACT

In a mobile wireless telecommunications system, which includes base stations (30) of a first type operating over a first air interface, and base stations (32) of a second type operating over a second air interface, a method for reselection by a mobile station (40) camped on a cell associated with a first base station (30), which is of the first type, of a second base station (32), which is of the second type. The method includes receiving signals over the second air interface from the second base station (32) and evaluating a characteristic of the signals. Responsive to the characteristic, the second base station (32) is selected in place of the first base station (30), and the mobile station (40) camps on a cell associated with the second base station (32).

23 Claims, 16 Drawing Sheets

IDLE MODE HANDLING IN A HYBRID GSM/CDMA NETWORK

RELATED APPLICATIONS

The present application is a divisional of U.S. patent application Ser. No. 09/409,947, filed on Sep. 30, 1999 now abandoned, and assigned to the assignee of the present application.

FIELD OF THE INVENTION

The present invention relates generally to wireless telecommunications, and specifically to advanced cellular telephone networks.

BACKGROUND OF THE INVENTION

The Global System for Mobile (GSM) telecommunications is used in cellular telephone networks in many countries around the world. GSM offers a useful range of network services and standards. Existing GSM networks are based on time-division multiple access (TDMA) digital communications technology, but an evolution is taking place toward the use of code-division multiple access (CDMA) technology. The present invention is applicable to both existing and future GSM networks, and although terminology used in the present patent application relates to existing GSM standards, it will be understood that the present invention is in no way limited to currently-existing standards or networks.

Handover in cellular systems can take place either while the MS is operating in a dedicated mode, i.e., during a telephone call, or while the MS is in an idle mode, between calls. The objective of the idle mode handover is to have the MS "camped on" the most appropriate base station cell of the network (i.e., tuned to the cell's control channels in order to receive paging and broadcast signals therefrom), and registered in the network via that cell. The MS is then ready to initiate or receive service requests immediately upon demand.

The GSM family of standards, and in particular, GSM standard 03.22, which is incorporated herein by reference, define idle mode operation in terms of three major, interrelated processes:

Selection of a public land mobile network (PLMN);
Cell selection and reselection; and
Location updating.

In the protocol stack defined by GSM standards for signaling between the MS and base station, these idle mode functions are carried out by a radio interface protocol layer 3 (RIL-3). Within this layer, the cell selection/reselection process is carried out by a radio resource management (RR) sub-layer; and the PLMN selection and location updating processes are carried out by a mobility management (MM) sub-layer.

Every time the MS enters the idle mode (upon switch-on or upon termination of a call), it selects a PLMN and attempts to camp on a cell of that PLMN. The particular PLMN to be contacted may be selected either manually or automatically, according to a predefined order of priorities. The cell selection procedure verifies that the MS is camped on a suitable cell, in which it will be able to reliably receive and decode data and in which it is likely to be granted access when initiating a call. Cell selection may be based on a general search of all possible base station channels, or it may be aided by reference to a stored list of cells and/or cell signal strength measurements made while the MS was in dedicated mode. The alternative methods of cell selection are referred to in GSM parlance as follows:

Normal Cell Selection, wherein the MS searches all channels in all supported bands of operation;

Stored List Cell Selection, wherein the search is based on a stored list of cells in order to speed up the initial cell selection; and Choose Cell Selection wherein the MS uses measurements made in dedicated mode in order to speed up cell selection after call termination.

Once the MS has selected and camped on the appropriate cell, it sends a location update message to the base station so as to register its location with the network.

The MS continually monitors the signal received from the current cell on which it is camped, as well as the signals from neighboring cells. If a cell change is indicated, for example, because the signal from one of the neighboring cells is stronger than that of the current cell, or because of network conditions and priorities, cell reselection is invoked, followed by location update as required. If the MS loses contact with the current cell, cell selection and, if necessary, PLMN selection are likewise invoked.

If no suitable cell is found or the MS is not permitted to receive service (if, for example, the GSM subscriber identity module [SIM] is not properly inserted, or the network rejects a location update request), the MS enters a limited service mode. In limited service, the MS attempts to camp on any cell that will allow it to make emergency calls, irrespective of its PLMN identity.

Although the above description refers specifically to GSM standards and TDMA operation, handover and idle mode functions are a part of other cellular systems and standards, as well. Code-division multiple access (CDMA) is an improved digital communications technology, which affords more efficient use of radio bandwidth than TDMA, as well as a more reliable, fade-free link between cellular telephone subscribers and base stations. The CDMA standard that is currently deployed is TIA/EIA-95 (commonly referred to as IS-95), promulgated by the Telecommunications Industry Association (TIA).

GSM and CDMA standards of relevance to the present patent application are listed for reference in Appendix A at the end of this specification.

Hybrid GSM/CDMA cellular communications systems are described in the patent literature, although none have yet been commercially deployed. For example, PCT patent application PCT/US96/20764, which is incorporated herein by reference, describes a wireless telecommunications system that uses a CDMA air interface (i.e., basic RF communications protocols) to implement GSM network services and protocols. Using this system, at least some of the TDMA base stations (BSSs) and subscriber units of an existing GSM network would be replaced or supplemented by corresponding CDMA equipment. CDMA BSSs in this system are adapted to communicate with GSM mobile switching centers (MSCs) via a standard GSM A-interface. The core of GSM network services is thus maintained, and the changeover from TDMA to CDMA is transparent to users.

Hybrid cellular communications networks, incorporating both GSM and CDMA elements, are also described in PCT patent publications WO 95/24771 and WO 96/21999, and in an article by Tscha, et al., entitled "A Subscriber Signaling Gateway between CDMA Mobile Station and GSM Mobile Switching Center," in Proceedings of the 2nd International Conference on Universal Personal Communications, Ottawa (1993), pp. 181–185, which are incorporated herein by reference. None of these publications deals with specific issues of how to implement efficient handovers and idle mode operation in such hybrid networks.

PCT patent application PCT/US97/00926, which is also incorporated herein by reference, describes methods of dedicated intersystem handover between CDMA and TDMA BSSs in a hybrid GSM/CDMA telecommunications system. A GSM/TDMA BSS generates pilot beacon signals in accordance with CDMA technology. During a telephone call, a subscriber unit detects the pilot signals and notifies a base station controller that the signals have been detected. The subscriber unit is then handed over from the CDMA to the TDMA BSS without interrupting the call.

SUMMARY OF THE INVENTION

It is an object of the present invention to provide methods and apparatus for use in a hybrid GSM/CDMA cellular communications network.

It is a further object of some aspects of the present invention to provide methods enabling improved idle mode operation of mobiles stations in a hybrid cellular network.

It is still a further object of some aspects of the present invention to provide improved methods and apparatus enabling handover of a mobile station between TDMA and CDMA base stations while the mobile station is in idle mode.

In preferred embodiments of the present invention, a mixed GSM/CDMA cellular communications system includes both TDMA and CDMA base station subsystems (BSSs), associated with a public land mobile network (PLMN). The system is preferably adapted to provide both circuit-switched and packet-switched services. Systems of this type are described generally in the above-mentioned PCT patent applications, and in U.S. patent application Ser. No. 09/365,967, which is assigned to the assignee of the present patent application and whose disclosure is incorporated herein by reference. A mobile station (MS) in the system is capable of communicating with both types of base stations, by appropriately switching between TDMA and CDMA air interfaces, while preferably using GSM network protocols over both types of interface. While operating in idle mode, the MS automatically selects a base station cell to camp on by receiving and evaluating signals from both TDMA and CDMA cells.

While the MS is camped on a cell of one type (TDMA or CDMA), it monitors cells of both the same type and of the other type. The MS can reselect a cell of either type, as appropriate, based on the signals received and on other predetermined criteria, such as network conditions and user preferences. The criteria and procedures for monitoring and reselection are preferably chosen so as to minimize power consumption by the MS in the idle mode. Further preferably, idle mode operation and cell selection/reselection by the MS are governed by a protocol stack including a hybrid GSM/CDMA radio resource management (RR) sub-layer. The hybrid RR sub-layer is aware of and chooses between TDMA and CDMA lower (physical) layers.

Preferably, to reduce cost, weight and power consumption, the MS has a single transceiver, with respective, selectable modes for GSM/TDMA and CDMA use. It will be appreciated, however, that the principles of the present invention may similarly be applied using mobile stations and networks of other types, for example, using a mobile station having separate or only partially integrated TDMA and CDMA transceivers, or in other hybrid networks that are not GSM-compliant.

In preferred embodiments of the present invention, idle mode behavior of the MS is based on balancing the following requirements:

To camp on the best cell available;
To avoid losing paging messages;
To minimize activity in idle mode in order to save battery life.

Preferably, the MS in idle mode continually assesses signal measurements from both the cell on which the MS is camped (referred to herein as the serving cell) and from neighboring cells, and also receives cell broadcast information from the network in order to select the most adequate cell available to camp on. Optimal cell selection has a direct influence on the rate of success in initiating a service call or responding to a paging request. Timely cell reselection, when a neighboring cell is found to be preferable to the serving cell, is useful in avoiding abrupt loss of coverage.

Similarly, in order to avoid losing paging messages, it is important to camp on the best available cell and to avoid "blind" camping on a cell that has not been evaluated in advance. This need is balanced, however, by loss of paging messages that may occur due to frequent changes of location area or air interface reselection.

The battery life depends on the amount of idle background activity. Every cell change and especially every change of location area or air interface reselection means increased activity, because the MS must read the new cell parameters and may have to set up a signaling connection for location update if the location area has changed. Monitoring multiple radio bands (such as the 900 and 1800 MHz bands of GSM) and dual air interfaces also means increased activity that will have impact on the battery life. Therefore, in order to save battery life, the MS preferably minimizes dual-interface activity and performs air interface reselection only when necessary.

In preferred embodiments of the present invention, the air interface is reselected under two alternative sets of circumstances:

Forced reselection, which occurs if there is an abrupt end of coverage of the active air interface (i.e., the air interface of the cell on which the MS is camped; the other of the two air interfaces is referred to in this context as the passive air interface). In such circumstances, the MS has no prior information regarding the cells of the new air interface, and must handle the change as though it were making an initial cell selection, as at power-on, for example.

Ordered reselection, which occurs upon expiration of predefined threshold conditions, having to do, for example, with the signal strengths or qualities of cells on the active air interfaces. In this case, the MS monitors both the active and passive air interfaces prior to mode reselection, and the mode change is preferably handled in a manner generally similar to a cell reselection.

Optionally, in addition to such network-invoked periodic searches, the MS itself operates a mode search timer so as to invoke periodic monitoring of the passive mode. The timer enables the MS to avoid endless camping on a less-preferred air interface.

Typically, one of the air interfaces, most preferably the CDMA air interface, is set by the network or by a user of the MS as the preferred air interface, over which the MS chooses to communicate when a choice exists between camping on a GSM/TDMA or GSM/CDMA cell. The preferred air interface is recorded in the MS, either in a subscriber identification module (SIM) inserted in the MS, or in a non-volatile memory of the MS itself. The SIM is preferably compatible with GSM standards, but includes an extended memory segment (file) for storing information, such as user preferences, relating to CDMA and hybrid operation.

Preferably, when forced reselection of the air interface occurs, the MS first attempts to select the last active interface, when known. Otherwise, the MS may select the user's preferred air interface, if such a preference is defined and programmed in the SIM, or a default air interface, programmed in the non-volatile memory. If no suitable cell is found on the selected air interface, the cell selection terminates, and the MS attempts to select other air interface(s). Preferably, to optimize selection when the MS has no a priori information on the existence or precedence of cells on one air interface or another, an initial decision on the order of interface selection is preferably preceded by an initial power measurement of signals received over both air interfaces on their respective frequency bands. Finally, if all available interfaces are attempted and no suitable cell is found, the mode selection terminates with a failure indication communicated to an upper protocol layer and thence to the user.

Preferably, the MS undertakes ordered reselection when predetermined reselection criteria have been met. For example, in a preferred embodiment of the present invention, the MS begins periodic monitoring of the passive air interface if all the following conditions are met:

The network broadcasts an indication to the MS that neighboring cells operating over the passive air interface are available; and The signal levels received by the MS from all cells operating over the active air interface are below a predetermined threshold (which may be broadcast over the network) for a given time period T, wherein preferably T=5 seconds; and There are fewer than a predetermined number of cells, preferably less than two such cells, in a list of "Neighbor Candidate" cells in the active mode for a given time period T.

The MS then decides whether to perform an air interface reselection by measuring and comparing the strengths of signals or the relative quality of signals received from cells over the active and passive air interfaces. In some preferred embodiments of the present invention, for purposes of the decision on air interface reselection, the measured signals strengths or qualities are weighted by combined reselection criteria, including:

Air interface preference (or priority), as described hereinabove;

Interface reselection hysteresis, a factor added to prevent frequent change between the air interfaces;

Strong neighbors (SN) assessment, to take into account a situation in which the MS is located in a border cell of a given coverage area, so as to change the active mode before encountering an abrupt end of coverage.

Other suitable criteria will be apparent to those skilled in the art.

There is therefore provided, in accordance with a preferred embodiment of the present invention, in a mobile wireless telecommunications system, which includes base stations of a first type operating over a first air interface, and base stations of a second type operating over a second air interface, a method for reselection by a mobile station camped on a cell associated with a first base station, which is of the first type, of a second base station, which is of the second type, including:

receiving signals over the second air interface from the second base station;

evaluating a characteristic of the signals;

responsive to the characteristic, selecting the second base station in place of the first base station; and camping on a cell associated with the second base station.

Preferably, one of the first and second air interfaces includes a TDMA air interface, and the other includes a CDMA air interface, wherein evaluating the characteristic includes applying a CDMA path loss criterion to the signals. Additionally or alternatively, selecting the second base station includes applying cell selection and reselection procedures over the CDMA air interface in a manner substantially transparent to a GSM radio interface protocol layer of the mobile station. Preferably, while the mobile station is camped on the cell associated with the base station operating over the CDMA air interface, it performs idle mode procedures generally in accordance with a GSM standard.

Further preferably, selecting the second base station in place of the first base station includes using a single radio resource management protocol layer in the mobile station supporting both GSM and CDMA operating modes. In a preferred embodiment, the radio resource management protocol layer includes parallel GSM and CDMA protocol sublayers and a combiner sublayer which selects either the GSM or the CDMA operating mode. Preferably, the combiner sublayer receives messages from a mobility management protocol layer at a service access point in accordance with GSM standards, and maps the messages to primitives which it directs to the selected GSM or CDMA sublayer.

In a preferred embodiment, receiving the signals over the second air interface includes receiving signals using a single radio transceiver in the mobile station which is also used to receive the signals over the first air interface. Preferably, receiving the signals includes receiving signals in either a GSM or a CDMA signaling mode.

Preferably, while the mobile station is camped on the cell associated with the first base station, it receives signals therefrom during intermittent active periods of the mobile station, and receiving the signals over the second air interface includes seeking and receiving signals during sleep periods of the mobile station intermediate the active periods.

In a preferred embodiment, receiving the signals includes controlling the mobile station to receive signals over the second air interface responsive to a detected loss of coverage by signals on the first air interface.

In another preferred embodiment, receiving the signals includes initiating monitoring of signals over the second air interface responsive to an indication that a predetermined monitoring criterion has been met. Preferably, the indication includes a message broadcast to the mobile station over the first air interface that cells are available over the second air interface. Further preferably, initiating the monitoring includes initiating monitoring over the second air interface responsive to a level of the signals received over the first air interface. Most preferably, the mobile station attempts to receive signals from a plurality of candidate cells over the first air interface, and wherein initiating the monitoring includes initiating monitoring over the second air interface when the signals received over the first air interface are below a predefined level for a predetermined period of time.

Preferably, the mobile station attempts to receive signals from a plurality of candidate cells over the first air interface, and initiating the monitoring includes initiating monitoring over the second air interface when the number of candidate cells over the first interface is less than a predetermined minimum number for a predetermined period of time. Additionally or alternatively, initiating the monitoring includes initiating monitoring upon expiration of a predetermined time period during which monitoring over the second air interface has not occurred.

In a preferred embodiment, receiving the signals includes regulating energy expended by the mobile station in receiving the signals responsive to a desired level of energy consumption by the mobile station. Preferably, regulating the energy expended includes setting a sampling rate at which to receive the signals responsive to the desired level of energy consumption. Additionally or alternatively, regulating the energy expended includes choosing a number of the base stations of the second type from which to receive the signals responsive to the desired level of energy consumption. Further additionally or alternatively, regulating the energy expended further includes regulating the availability of the mobile station to receive the signals responsive to a desired level of quality of service provided by the mobile station.

Preferably, evaluating the characteristic includes comparing the signals received from the second base station to signals received over the first air interface from the first base station and applying reselection criteria to the received signals so as to determine whether to select the second base station. In a preferred embodiment, applying the criteria includes weighting measured characteristics of the signals responsive to a predetermined air interface preference. Preferably, the preference is set by a user of the mobile station. Alternatively, the preference is set by a network with which the base stations are associated. Additionally or alternatively, the mobile station stores a record of the preference.

Preferably, applying the criteria includes applying a predetermined hysteresis factor so as to prevent recurrent reselection of the air interface.

In a preferred embodiment, comparing the signals includes performing an assessment of strong neighbor cells when the mobile station is in a border area of coverage provided over the first air interface.

Preferably, evaluating the characteristic includes comparing power levels of the signals received over the first and second air interfaces and comparing path-loss criteria derived from the signals received over the first and second air interfaces.

Additionally or alternatively, selecting the second base station includes selecting a base station responsive to selection by the mobile station of a public land mobile network with which to communicate.

In a preferred embodiment, selecting the second base station includes receiving information broadcast over the first air interface in relation to criteria for interface reselection, and selecting the second base station responsive to the broadcast information.

In another preferred embodiment, selecting the second base station includes storing information in a memory module of the mobile station in relation to criteria for interface reselection, and selecting the second base station responsive to the stored information.

There is further provided, in accordance with a preferred embodiment of the present invention, in a mobile wireless telecommunications system, which includes a first cell associated with a first air interface, and a second cell associated with a second air interface, a mobile station, including:
  at least one radio transceiver, which receives signals from the first and second cells over the first and second air interfaces, respectively; and
  control circuitry, which processes the signal received from the second cell while the mobile station is camped in idle mode on the first cell, and which evaluates the second signal and, responsive thereto, directs the mobile station to reselect and camp on the second cell.

Preferably, the at least one transceiver includes a single radio transceiver capable of operating over either the first or the second air interface.

In a preferred embodiment, the mobile station includes a Subscriber Information Module, which stores information in relation to criteria for interface reselection, and the control circuitry determines whether the mobile station should reselect and camp on the second cell responsive to the stored information.

There is also provided, in accordance with a preferred embodiment of the present invention, in a mobile wireless telecommunications system, a method for cell reselection by a mobile station camped on a first cell, including:
  receiving signals over the air from a second cell;
  determining whether the second cell belongs to a different location area from the first cell;
  evaluating a characteristic of the signals, responsive to the determined location area of the second cell; and
  responsive to the evaluation, selecting the second cell for camping in place of the first cell.

Preferably, evaluating the characteristic of the signals includes applying a threshold criterion to the signals. The threshold is preferably relatively higher when the second cell belongs to a different location area than the first cell and is relatively lower when the second cell belongs to the same location area as the first cell.

In a preferred embodiment, determining whether the second cell belongs to a different location area includes receiving a broadcast from the first cell indicating the location area of the second cell.

In another preferred embodiment, determining whether the second cell belongs to a different location area includes looking up in a memory of the mobile station a stored record of the location area of the second cell.

There is additionally provided, in accordance with a preferred embodiment of the present invention, in a mobile wireless telecommunications system, a mobile station, including:
  a radio transceiver, which receives signals from a second cell while the mobile station is camped on a first cell; and
  control circuitry, which determines whether the second cell belongs to a different location area from the first cell and processes the signals received from the second cell responsive to the determined location area of the second cell, so as to decide whether to select the second cell for camping in place of the first cell.

The present invention will be more fully understood from the following detailed description of the preferred embodiments thereof, taken together with the drawings in which:

BRIEF DESCRIPTION OF THE DRAWINGS AND APPENDICES

Appendix A contains a listing of published standards of relevance to the present invention, which are incorporated herein by reference;

Appendix B contains an explanatory summary of terms and abbreviations used in the present patent application, provided for the convenience of the reader; and Appendix C contains a description of interfaces, primitives and state variables associated with radio resource (RR) management protocols carried out by a mobile station, in accordance with a preferred embodiment of the present invention.

DETAILED DESCRIPTION OF PREFERRED EMBODIMENTS

General Features of a Hybrid GSM/CDMA Cellular System

Figure 1:
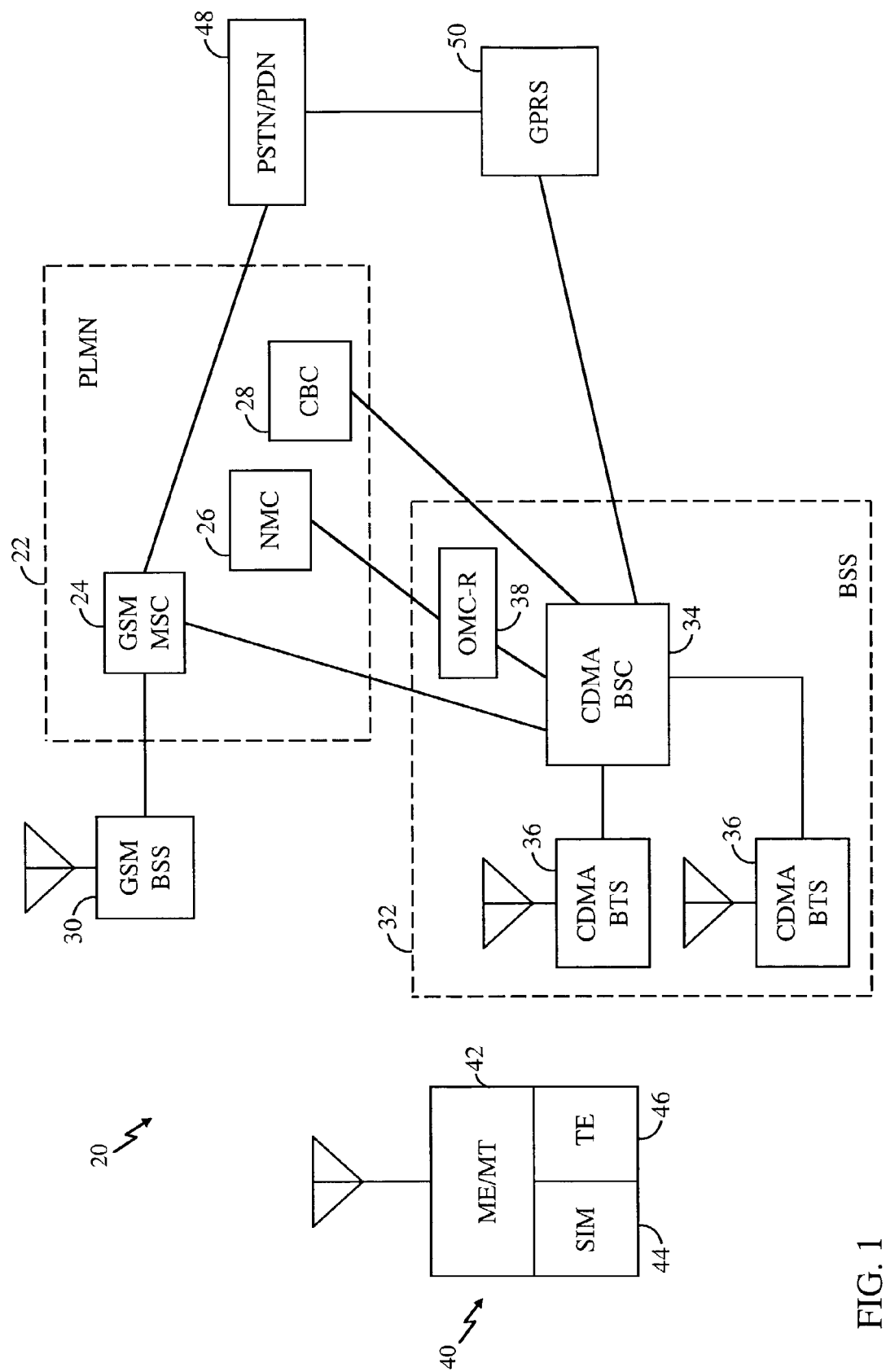
FIG. 1 is a schematic block diagram of a hybrid GSM/CDMA cellular communications system, in accordance with a preferred embodiment of the present invention.

Reference is now made to FIG. 1, which is a schematic block diagram of a hybrid GSM/CDMA cellular communications system 20, in accordance with a preferred embodiment of the present invention. System 20 is built around a public land mobile network (PLMN) 22, which is based on GSM network protocols, as described hereinabove. Although for the sake of simplicity, only one PLMN is shown in FIG. 1, there may be multiple, different networks of this sort through which subscriber units can communicate.

PLMN 22 comprises at least one mobile-services switching center (MSC) 24, or possibly a number of such centers (although only one MSC is shown here for clarity of illustration), which controls network operations within a geographical area. Among other functions, MSC 24 is responsible for location registration of subscriber units and handover of subscriber units between base stations, as well as linking PLMN 22 to a public switched telephone network (PSTN) and/or packet data network (PDN) 48. The PLMN also comprises a network management center (NMC) 26 and a cell broadcast center (CBC) 28, in accordance with GSM standards. The functions and operation of system 20 are described further in the above-mentioned U.S. patent application Ser. No. 09/365,967.

System 20 includes a plurality of mobile stations (MS) 40, which communicate with PLMN 22 via a plurality of base station subsystems (BSS) 30 and 32 over a wireless RF link in one or more of the accepted cellular communications frequencies. MS 40, which is also known as a subscriber unit, is capable of communicating with both GSM BSS 30, using a substantially standard GSM TDMA signaling protocol, and CDMA BSS 32, using CDMA-based communication methods described hereinbelow.

Both GSM BSS 30 and CDMA BSS 32 communicate with and are controlled by MSC 24. Communications between GSM BSS 30 and MSC 24 are substantially in accordance with GSM standards. CDMA BSS 32 communicates with PLMN 22 in accordance with GSM standards,. BSS 32 also communicates with CBC 28, so as to receive messages to be broadcast over the air, preferably as described in U.S. patent application Ser. No. 09/365,963, which is assigned to the assignee of the present patent application and whose disclosure is incorporated herein by reference. BSS 32 preferably also comprises a radio operation and maintenance center (OMC-R) 38, which communicates with NMC 26.

Communications between CDMA BSS 32 and MS 40 are built on a CDMA "air interface," which is preferably generally in accordance with the IS-95 standard for CDMA communications. BSS 32 is built around a base station controller (BSC) 34, which controls and communicates with a number of base station transceivers (BTS) 36. Each BTS transmits RF signals to and receives RF signals from MS 40 when the MS is within a geographical area, or cell, served by the particular BTS. When entering idle mode, either immediately after switch-on or in between calls, the MS selects and camps on one of the cells. While in the idle mode, the MS continually monitors other, generally neighboring, cells to determine whether to select a new cell on which to camp.

Figure 2:
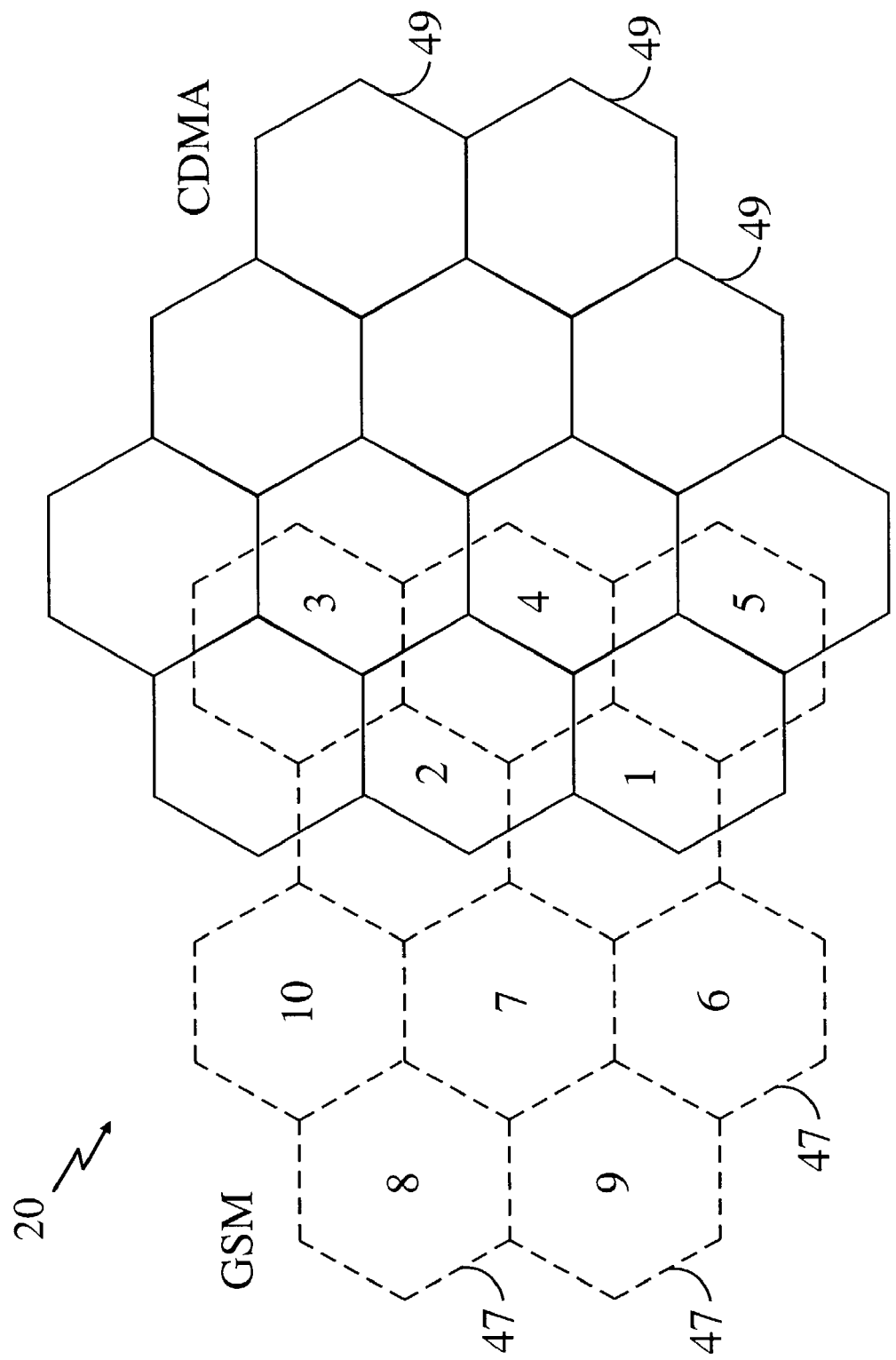
FIG. 2 is a schematic illustration showing cells in the system of FIG. 1, useful in understanding methods of cell and air interface selection in idle mode, in accordance with preferred embodiments of the present invention.

FIG. 2 is a schematic map of overlapping GSM/TDMA cells 47 and GSM/CDMA cells 49 in system 20, illustrating aspects of idle-mode cell selection, in accordance with a preferred embodiment of the present invention. When MS 40 is in a region served only by TDMA cells 47 (i.e., associated with GSM BSS 30), it will select and camp on one of these cells and will periodically monitor signals received from neighboring cells to determine whether cell reselection (selection of a new TDMA cell to camp on) is called for. When the MS moves into any of cells 1–5 shown in FIG. 2, however, it may also monitor CDMA signals from cells associated with CDMA BSS 32. If appropriate, the MS will select one of the CDMA cells to camp on, so that not only the cell, but also the air interface, is reselected. Cells 3, 4 and 5 would be considered "border cells," in which MS 40 is known to be reaching the end of the region served by GSM/TDMA BSSs and in which reselection of the air interface may be required. Similar processes of cell and air interface reselection take place when the MS is served by one of the CDMA cells.

Methods for performing such monitoring, cell selection and reselection in system 20 are described further hereinbelow. Methods for performing handovers between GSM/CDMA and GSM/TDMA service and vice versa in dedicated mode (during a call), as well as between one CDMA BSS 32 and another in system 20, are described further in the above-mentioned U.S. patent application Ser. No. 09/365, 967. By virtue of such methods and of the architecture of system 20, as shown in FIG. 1, MS 40 receives the benefits of CDMA service in those regions served by system 20 in which the service has been implemented, without losing service in TDMA regions. Transitions between CDMA and TDMA regions are substantially transparent to users of MS 40, because higher-level GSM network protocols are observed throughout the system, and only the lower-level RF physical interface is changed during the transition.

Mobile Station Structure and Protocols

Figure 3:
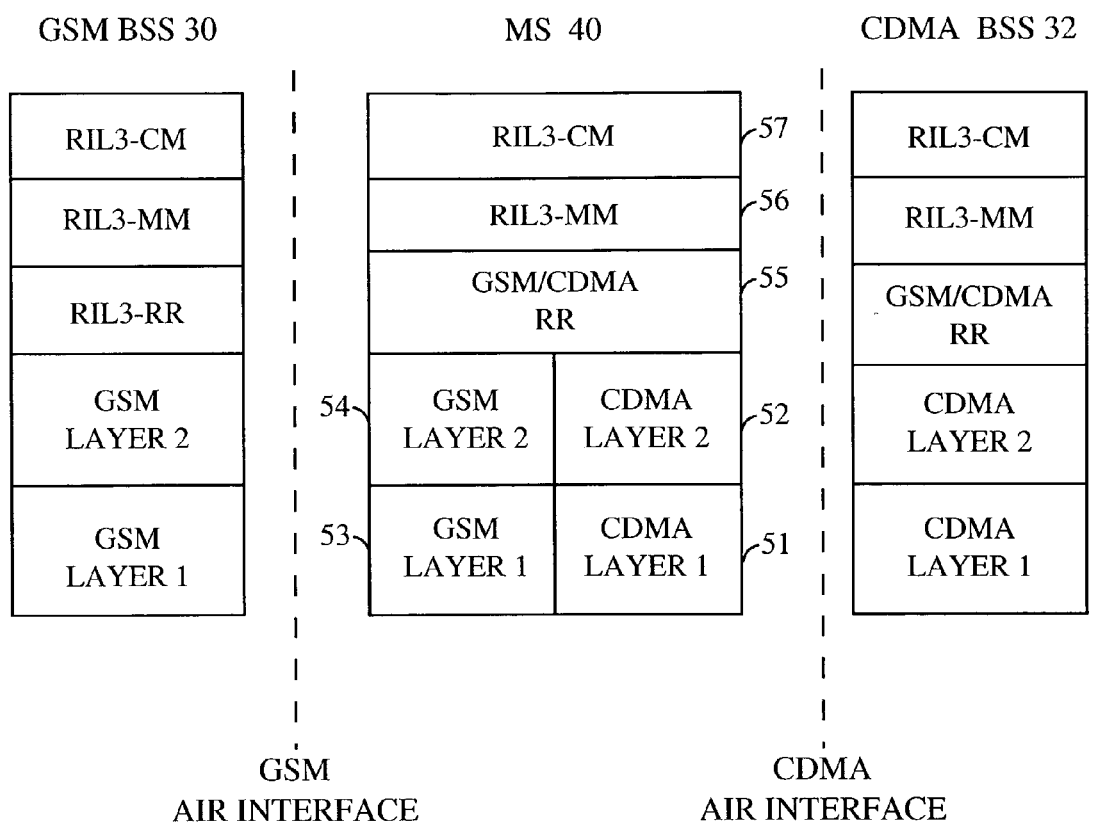
FIG. 3 is a schematic block diagram illustrating communication protocols between a mobile station and base station subsystems in the system of FIG. 1, in accordance with a preferred embodiment of the present invention.

FIG. 3 is a block diagram that schematically illustrates communications protocol stacks between MS 40 and BSSs 30 and 32, in accordance with a preferred embodiment of the present invention. MS 40 communicates with GSM BSS 30 over a GSM/TDMA air interface, in accordance with GSM standards substantially without modification. Therefore, substantially no modification is required to BSS 30 or to GSM Layer 1 and Layer 2 standard interface protocols, indicated by blocks 53 and 54 in the figure, in order to accommodate MS 40. MS 40 communicates with CDMA BSS 32 over a CDMA air interface, preferably based on a CDMA IS-95 air interface with certain modifications. Mobile stations known in the art are capable of operating over either a GSM air interface or a CDMA air interface, but not both.

In order to sustain both of these interfaces, MS 40 comprises mobile equipment (ME) 42 (FIG. 1), which includes either two radio transceivers, one configured for TDMA operation and one for CDMA, or a single transceiver which can dynamically switch between TDMA and CDMA. The ME also includes mobile termination (MT), which supports terminal equipment (TE) 46 for voice and/or data input and output. In addition, MS 40 comprises a subscriber identity module (SIM) 44, in accordance with GSM standards.

Figure 4:
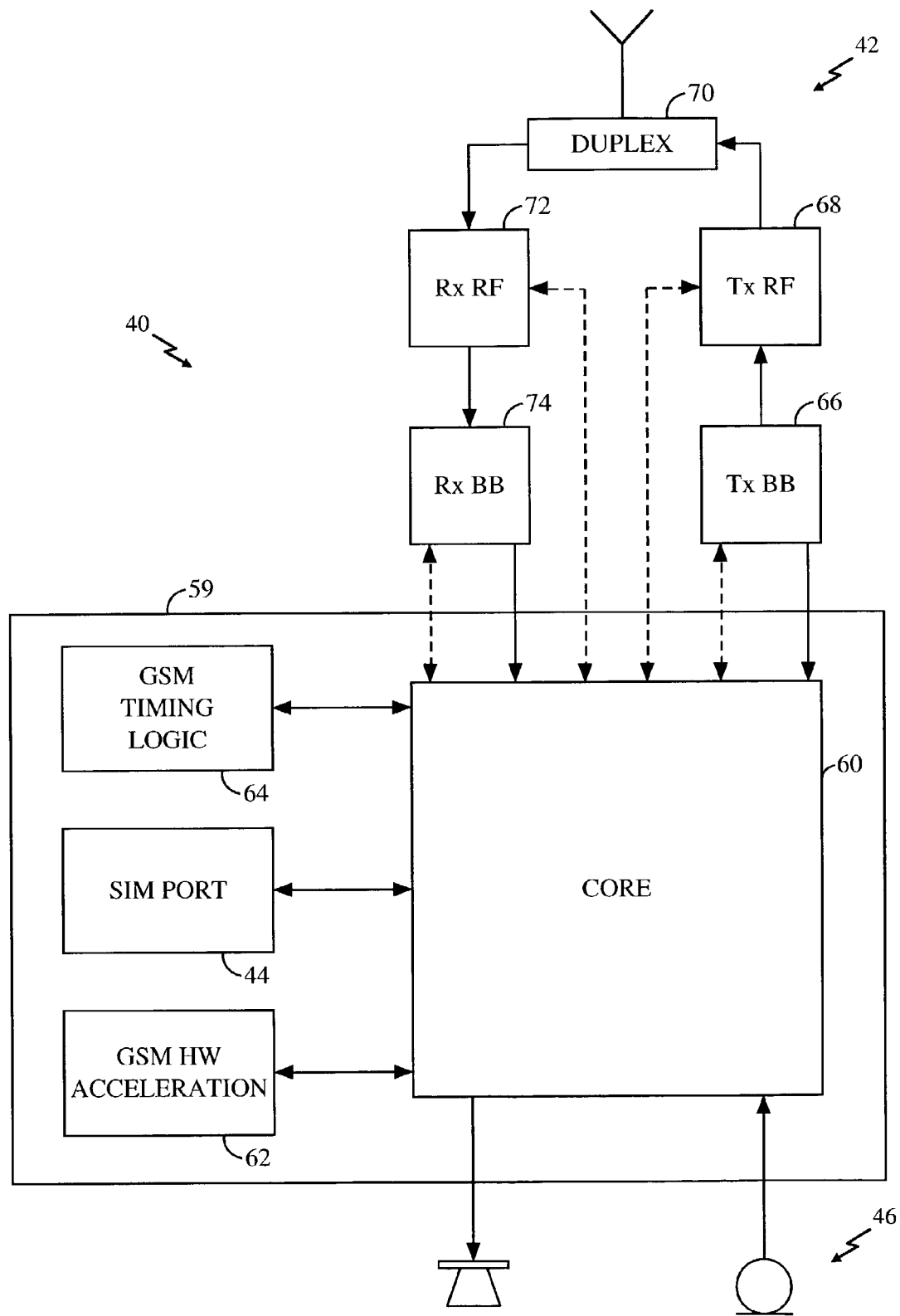
FIG. 4 is a schematic block diagram of a hybrid GSM/CDMA mobile station, in accordance with a preferred embodiment of the present invention.

FIG. 4 is a schematic block diagram illustrating MS 40, which here comprises a single radio transceiver in ME 42, in accordance with a preferred embodiment of the present invention. MS 40 is built around a modem unit 59, including a DSP core 60 capable of generating and processing both TDMA and CDMA signals. Preferably, core 60 comprises an ASIC device, including stand-alone CDMA transmission/reception processing, which is supported by GSM timing logic 64 and a GSM hardware accelerator (or DSP) 62, as well as having a port for SIM 44. Core 60 receives input and delivers output to TE 46. In this case, TE 46 is represented as an audio microphone and speaker, and core 60 performs D/A and A/D conversion, as well as vocoding functions on the audio signals, as are known in the art. Core 60 may, additionally or alternatively, be configured to work with TE 46 providing digital data input/output, such as a fax device.

Core 60 outputs digital data, which may be in either TDMA or CDMA format, to a mixed-signal output device 66. Device 66 processes and converts the data to analog baseband form, for input to RF transmitter 68. A duplexer 70 conveys the resultant RF signals via antenna to the GSM or CDMA base station, as appropriate. Signals received from the base station are passed by duplexer 70 through an RF receiver 72 and a mixed-signal input device 74, which performs baseband conversion and AGC functions, to core 60. Preferably, transmitter 68, receiver 72 and mixed-signal devices 66 and 74 are controlled by core 60.

In a preferred embodiment of the present invention, SIM 44 of GSM/CDMA MS 40 comprises an extended read/write memory. This memory is used to record date and programs used in GSM/CDMA operation, which are not required for or supported by conventional GSM operation. Additionally or alternatively, the MS includes an integral non-volatile memory, independent of the SIM, in which such data and programs are stored.

RF transmission and reception by MS 40 are preferably at frequencies in the GSM 900 and/or 1800 MHz bands, for compatibility with existing GSM equipment, particularly BSS 30. Preferably, transmitter 68 and receiver 72 are dual-band devices, capable of operating in both of the GSM bands. Assuming that MS 40 includes only the single transceiver shown in FIG. 4, operating in the GSM band, CDMA equipment in system 20 must be appropriately configured to operate in these frequency ranges, as well.

While MS 40 is in idle mode, i.e., not engaged in setting up or carrying out a call, it camps on and actively "listens" to messages from a cell belonging to either GSM BSS 30 or CDMA BSS 32, so as to be prepared to receive a paging message from the appropriate BSS. The cell on which the MS is camped is referred to herein as the serving cell. Methods by which the MS selects one or the other of the air interfaces and selects the cell on which to camp are described further hereinbelow. The MS also monitors other cells belonging to the selected air interface, referred to herein as the active interface, in order to determine whether to select a different serving cell. In order to reduce power consumption in idle mode, typically only one of the air interfaces is active at any given time. The other air interface is referred to herein as the passive interface. Under certain circumstances, which are also described hereinbelow, the MS monitors signals from cells on the passive air interface, whereupon the passive interface may be reselected to be the active interface, and vice versa.

Returning to FIG. 3, whether MS 40 physically includes one transceiver or two, it must support dual air interface Layers 1 and 2 in its protocol stack, for operation vis-a-vis GSM BSS 30 and CDMA BSS 32, respectively. As noted above, at any given time, one of these air interfaces is selected to be active, and the other is passive. The CDMA air interface between MS 40 and CDMA BSS 32 comprises CDMA Layer 1 (block 51 in the figure), also known as the physical layer, which preferably operates on a standard IS-95 protocol, and CDMA data link Layer 2 (block 52), preferably based on IS-95, with appropriate modification to accommodate the needs of GSM network services.

In idle mode operation, the GSM/CDMA physical layer in the MS 40 monitors broadcast channels of CDMA BTS 36 for messages addressed to the MS, operating in either slotted or non-slotted mode as appropriate, as described in the above-mentioned U.S. patent application Ser. No. 09/365, 963. This occurs as long as the CDMA air interface is active, or when the GSM air interface is active but conditions have arisen in which cells are to be monitored on the passive CDMA air interface, as well. The physical layer passes messages to the upper protocol layers in coordination with the slotted mode operation of the MS.

When the CDMA air interface is active, CDMA Layer 1 measures the strength of a pilot beam associated with the serving cell and a predetermined number of neighbor cells belonging to the active interface, preferably six such cells. The measurement is preferably refreshed about once per second. On the other hand, when the GSM/TDMA air interface is the active one, CDMA Layer 1 can also be called upon by a GSM/CDMA RR sublayer 55 (described further hereinbelow) to monitor the timing, quality, RF signal strength and cell information of neighboring cells belonging to the passive CDMA interface. These functions are substantially similar to those carried out by GSM/TDMA Layer 1 in accordance with GSM specifications.

CDMA Layer 2 preferably conforms to IS-95 specifications, but also includes functionality, such as message ordering, priority and fragmentation, and suspension and resumption of communications, which is normally supported by the standard GSM Layer 2, but not by CDMA IS-95. In particular, while MS 40 is in idle mode, CDMA Layer 2 supports both unacknowledged operation on paging and access channels, in accordance with IS-95 specifications, and acknowledged operation for idle mode channel request, which is a feature of GSM specifications. The design and operation of such a CDMA Layer 2 are described in greater detail in a U.S. patent application entitled, "Signaling Data Link for a GSM-CDMA Air Interface," filed Sep. 29, 1999, which is assigned to the assignee of the present patent application and whose disclosure is incorporated herein by reference. Vis-a-vis GSM BSS 30, air interface Layers 1 and 2 are in accordance with GSM standards, substantially without modification.

As noted in the Background of the Invention, standard GSM protocols include a Radio Interface Layer Three (RIL3), including three sub-layers, above GSM Layer 1 and Layer 2. The lowest of these three RIL3 sub-layers is a Radio Resource (RR) management sub-layer, which provides services to Mobile Management (MM) and Connection Management (CM) sub-layer above it. The RIL3 sub-layers in GSM BSS 30 are substantially unchanged with respect to the GSM standard, and the GSM MM and CM sub-layers are likewise maintained substantially without change in MS 40. The CM sub-layer supports signaling for call processing, as well as GSM supplementary services and short message service (SMS). The MM sub-layer supports signaling required for updating the location of MS 40 and PLMN selection, as described further hereinbelow, and communicates with SIM 44.

In order to support the unmodified upper MM and CM sub-layers, GSM-CDMA RR sub-layer 55 is introduced in the MS 40 and BSS 32 protocol stacks. The GSM/CDMA RR sub-layer in the MS, which manages radio resources and maintains radio links between MS 40 and BSSs 30 and 32, is "aware" of the existence of the dual GSM and CDMA lower layers (Layers 1 and 2) in the MS 40 protocol stack. It invokes the appropriate lower layers in the MS stack to communicate with either the standard RIL3-RR sub-layer of BSS 30 over the GSM air interface or the GSM/CDMA RR sub-layer of BSS 32 over the CDMA air interface. The MM and CM sub-layers are not processed by BSS 32, but are rather relayed through between MS 40 and MSC 24 for processing in a manner substantially transparent to the CDMA air interface layers below.

GSM/CDMA RR sub-layer 55 supports standard GSM RIL3-MM and CM sub-layers 56 and 57 above it regardless of which of the air interfaces is in use. The RR sub-layer preferably offers complete radio resource management functionality as defined by GSM specifications 04.07 and 04.08, which are incorporated herein by reference. Although a "RR" sub-layer per se is not defined by the CDMA IS-95 standard, the GSM/CDMA RR sub-layer described herein preferably maintains full IS-95 radio resource functionality, as well.

In accordance with GSM standards, the functionality of the RR sub-layer includes both idle mode operation and dedicated mode services (i.e., services performed during a telephone conversation). The idle mode operation of the RR sub-layer includes automatic cell selection and reselection (idle handover) between GSM and CDMA cells, as well as between pairs of CDMA cells and pairs of GSM cells, with cell change indication as specified by GSM standards, and particularly GSM standard 05.08. The RR sub-layer in idle mode also performs monitoring of neighboring cells, broadcast channel processing, as specified by GSM and CDMA standards, and establishment of RR connections.

It will be understood by those skilled in the art that the above features of RR sub-layer 55 are listed only by way of a summary, and that additional details and features may be added based on published GSM and CDMA specifications.

Figure 5:
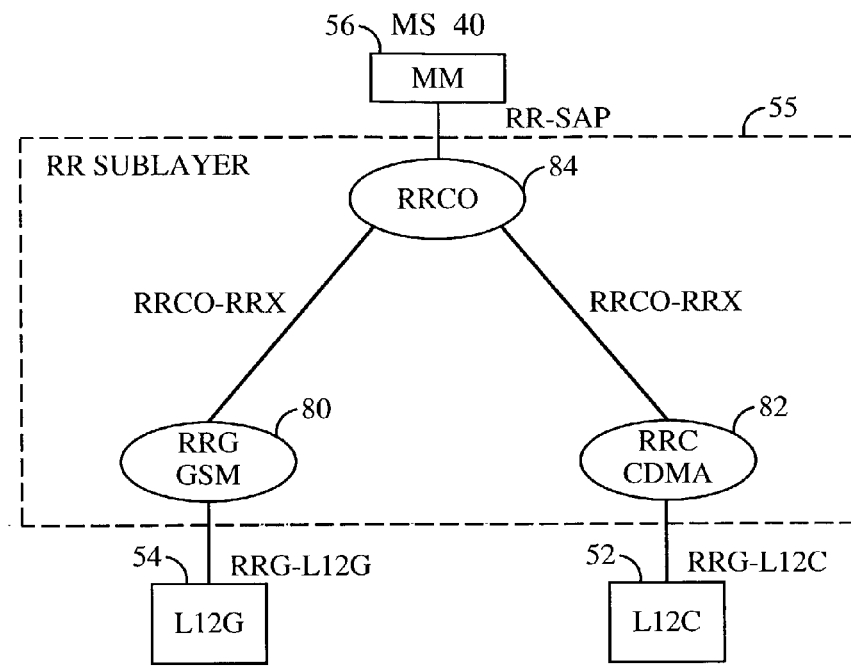
FIG. 5 is a schematic block diagram illustrating details of protocol layers shown in FIG. 3, in accordance with a preferred embodiment of the present invention.

FIG. 5 is a block diagram illustrating details of GSM/CDMA RR sub-layer 55, in accordance with a preferred embodiment of the present invention. The RR sub-layer preferably includes separate GSM and CDMA idle mode processes, labeled RRG 80 and RRC 84, respectively, in the figure. The RRG and RRC processes are together referred to hereinbelow as the RRX processes. Each of the processes is responsible for idle mode communications of MS 40 with BTSs of the respective type and interfaces with the respective GSM/TDMA or GSM/CDMA Layer 2. Operation of the RRG and RRC processes is coordinated by a RR combiner (RRCO) process 84.

The RR combiner interfaces to the MM sub-layer above it through a substantially standard GSM service access point (SAP), preferably as defined by GSM standard 04.07. Thus, MM sublayer 56 can be programmed and can operate entirely in accordance with GSM standards, substantially without modification. Services provided by the RR sublayer to the MM sublayer, as required by GSM standards, preferably include:

Indicating to the MM sublayer when the paging channel of the serving cell is unavailable.

Accepting service requests from the MM sublayer and indicating to the MM sublayer if a failure occurs in accessing the cell.

Reporting to the MM sublayer any changes of relevant cell information.

Reporting to the MM sublayer upon successful cell selection, as well as upon failing to select a cell because there is no service available.

Generating a list of available PLMNs when requested by the MM sublayer.

Preferably, both the RRG and RRC processes respectively include substantially the full functionality of the GSM RR sub-layer or the equivalent IS-95 radio resource management capabilities. In idle mode, this functionality includes cell selection and reselection, as described further hereinbelow. The RRCO process (in idle mode) is then largely limited to selection and reselection of the active air interface: GSM/TDMA or GSM/CDMA. This approach is advantageous in that it can be implemented easily and quickly, using existing RRG and RRC program codes. Alternatively, more efficient use of memory may be obtained by reducing the functionality of the RRG and RRC processes and programming the RRCO process to perform cell selection and reselection.

In accordance with the features of idle mode operation of MS 40 described hereinabove, one of the RRG and RRC processes is defined as the active process, depending on whether the MS is camped on a TDMA or a CDMA cell. The active process controls the transceiver in ME 42 (FIG. 4) and executes appropriate camped cell activity, in accordance with GSM standards. The other one of the processes is the passive process, and is preferably limited to the minimal activity needed to support periodic monitoring on the passive air interface and possible cell/air interface reselection, in order to reduce power consumption by the MS and thus prolong battery life. If extended cell broadcast information regarding the second air interface is transmitted by the serving cell, the active process also receives and passes the relevant information to the RRCO.

In order to decide whether to perform an air interface reselection, the RRCO intermittently passes a measurement request to the passive process, which then makes the measurement and passes the results back to the RRCO. Preferably, the measurement is made during "sleep periods" of the active process operating in DRX (discontinuous receive) mode, as reported to the RRCO by the active process. The RRCO compares the measurements received from the passive mode process with measurements made and passed to the RRCO by the active mode process and based on the comparison, decides when to make an air interface reselection.

Figure 6:
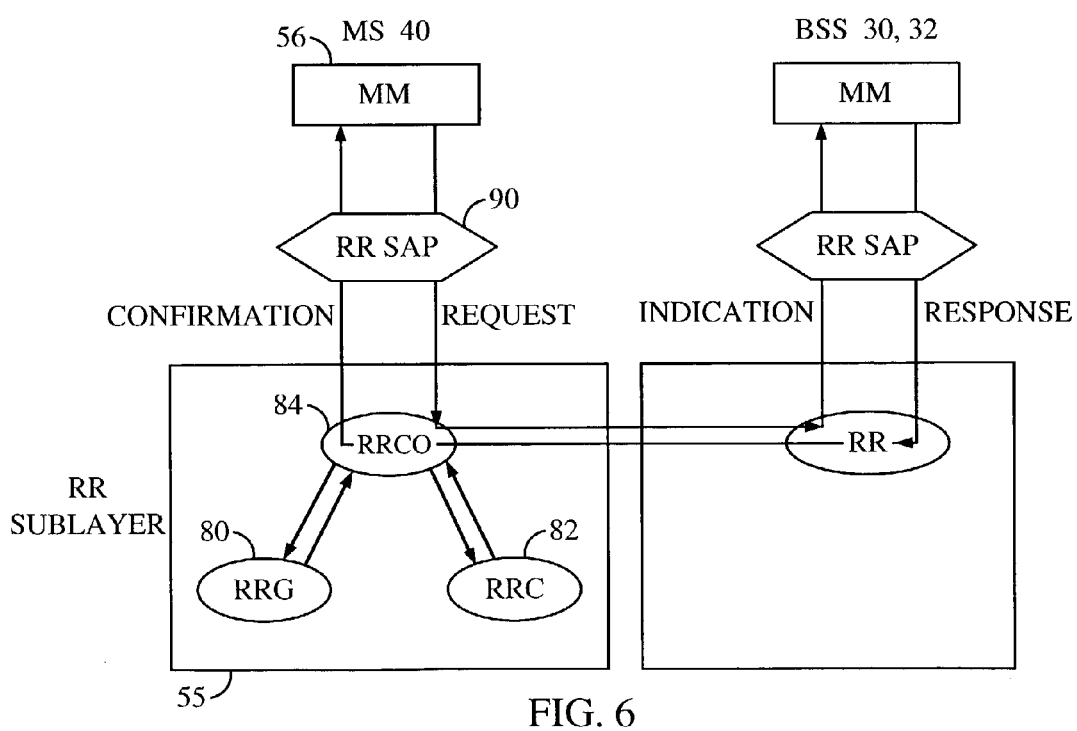
FIG. 6 is a schematic block diagram illustrating message flows between the protocol layers shown in FIG. 3, in accordance with a preferred embodiment of the present invention.

FIG. 6 is a block diagram that schematically illustrates message flow between RRCO process 84 and other layers and sublayers in MS 40 and in BSSs 30 and 32. As noted hereinabove, RRCO 84 communicates with MM layer 56, preferably via a RR SAP 90, which is substantially in accordance with GSM protocol standards, particularly GSM standard 04.07. RRCO 84 maps MM requests conveyed via SAP 90 into state variables appropriate to whichever of processes RRG 80 and RRC 82 is active and then downloads the state variables to the RRG or RRC process. Communications over SAP 90 are based on service primitives defined by the GSM standard, and may include certain additions for enhanced GSM/CDMA operation. The primitives and associated parameters conveyed between RRCO 84 and MM sublayer 56, as well as between RRCO 84 and RRG 80 or RRC 82 are described in Appendix C.

GSM standard 03.22 defines idle mode behavior of the MS, and particularly of the RR protocol sublayer of the MS, in terms of a dual state machine, having normal and limited service modes. For each such service mode, the MS begins in a select state (which may be a "normal select," "stored list select," or "choose select" state, as defined in the Background of the Invention), from which the MS attempts to select and camp on a suitable cell, in a camp state. When necessary, the MS enters a reselect state, wherein a new cell is selected to camp on.

In a preferred embodiment of the present invention, each of the GSM states of the RR sublayer is mapped to a corresponding state of the active RRX process (i.e., RRG or RRC) and of the RRCO process. States of the RRX and RRCO processes and transitions among the states are further described hereinbelow with reference to FIGS. 8 and 9.

Overview of Idle Mode Procedures

Figure 7A:
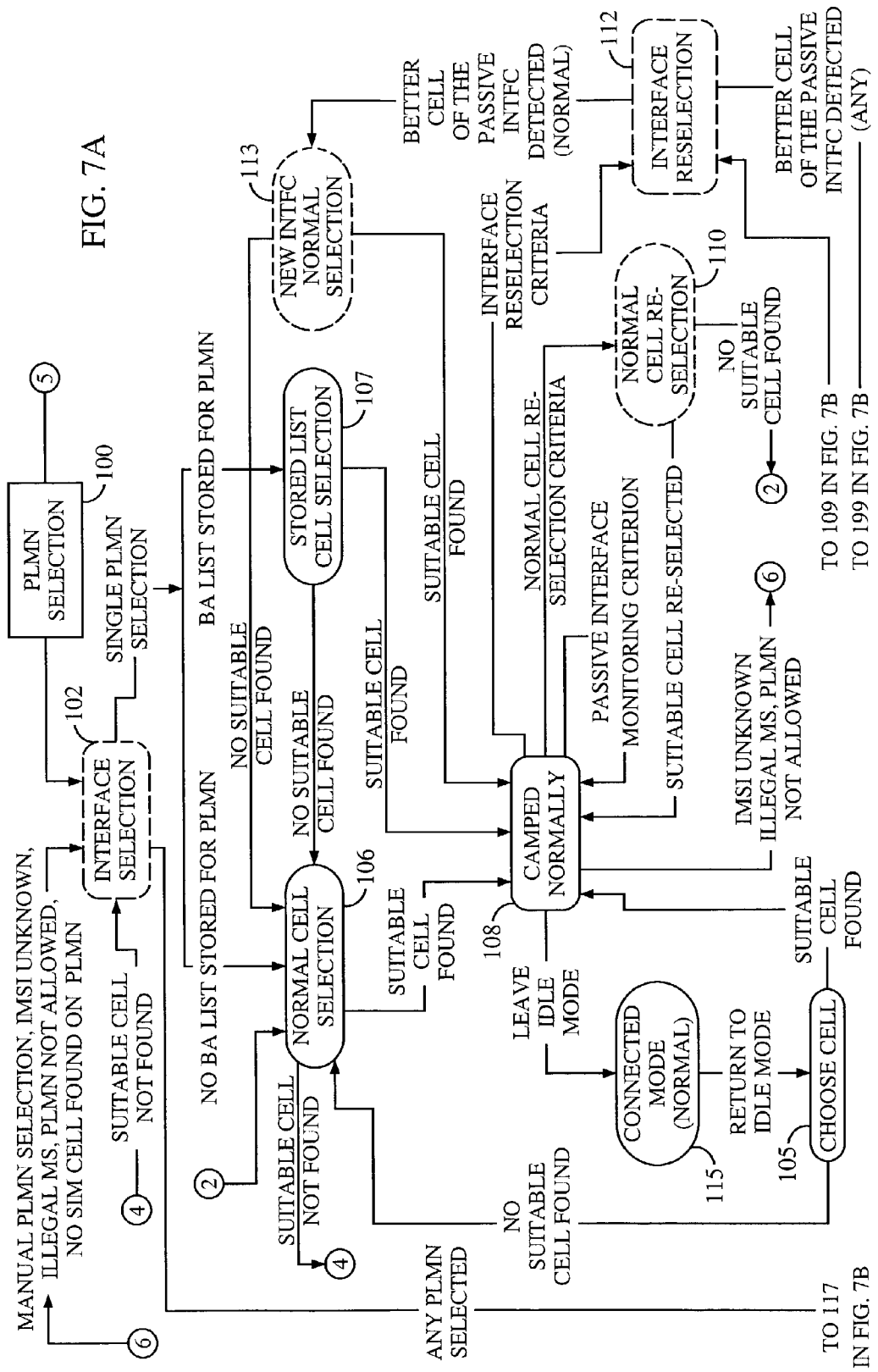
FIGS. 7A–7B are flow charts illustrating idle mode behavior of a mobile station in the system of FIG. 1, in accordance with a preferred embodiment of the present invention.
Figure 7B:
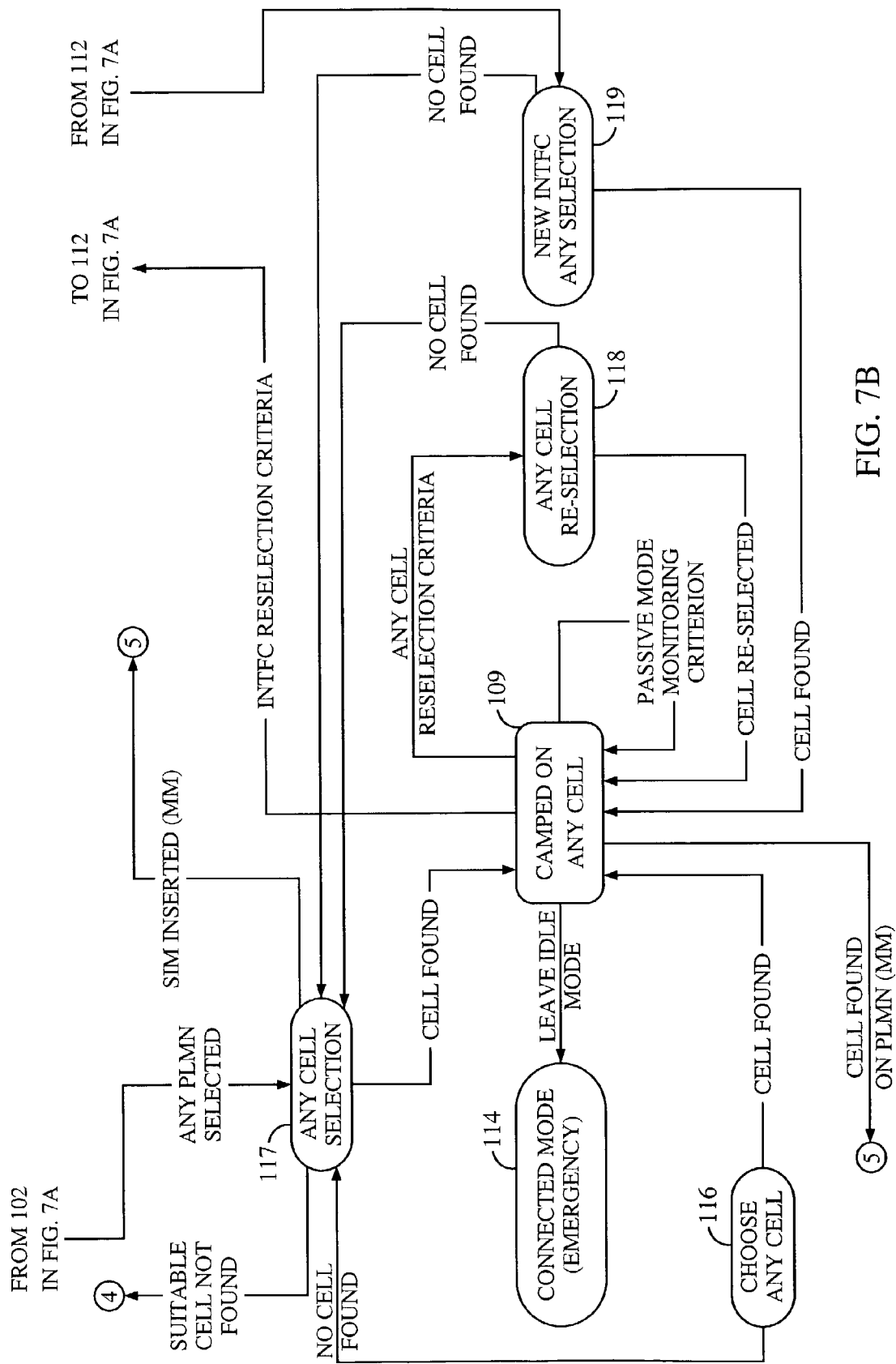

Reference is now made to FIG. 7, which is a flow chart that schematically illustrates idle mode behavior of GSM/CDMA MS 40, in accordance with a preferred embodiment of the present invention.

Upon initialization (switch-on), MS 40 enters a PLMN selection state 100, in which it selects a PLMN, under the control of MM protocol sublayer 56, typically in accordance with PLMN selection criteria defined by GSM standards. As noted above, if the MS is unable to select a PLMN (as required for normal service), it will enter the limited service mode, according to the GSM limited service criteria. MS 40 then begins idle mode monitoring of signals received from cells in its geographical area, over either one or both of the GSM/TDMA and CDMA air interfaces. The MS enters an interface selection state 102, in which it selects one of the air interfaces to be the active one, based on the monitoring results and interface selection criteria described hereinbelow.

Having selected the air interface, and having successfully selected a PLMN, MS 40 enters a normal cell selection state 106 or a stored list cell selection state 107, in which it attempts to select a cell that fulfills suitable cell criteria for the selected active air interface. Cell selection may also involve band selection, such as between the GSM 900 and 1800 MHz bands. The cell selection states, along with a camping state 108 and a cell reselection state 110, belongs to a group of states that are specific to the selected air interface. In other words, when the GSM/TDMA air interface is selected, the behavior of the MS in these states and the decision criteria for making transitions among the states are substantially in accordance with relevant GSM standards. On the other hand, when the GSM/CDMA air interface is selected, the behavior and decision criteria, as described hereinbelow, may differ, although they are still similar to the GSM standards.

Whichever air interface has been selected, the MS continues to search for a suitable cell, but gives up if it has not found a cell and "no suitable cell" criteria are met for the active interface. (If the MS is in stored list selection state 107 and reaches the end of the stored list of available cells without finding a suitable cell, it first proceeds to normal selection state 106 and continues the search.) In this case, the MS returns to interface selection state 102, chooses the other (passive) air interface to be the active one, and then returns to cell selection state 106 or 107. If the MS gives up on cell selection over both air interfaces, a "no service" indication is passed back to the upper protocol layer (MM).

Upon successful cell selection (again, assuming a PLMN to have been successfully selected), the MS enters state 108, in which it camps on the selected cell and carries out normal camped cell activity as appropriate. When necessary upon cell selection or reselection, a location update is performed, in accordance with GSM standards. Periodically, the MS monitors neighboring cells on the active air interface, based on monitoring criteria described hereinbelow. When cell reselection criteria are met, the MS enters state 110, in which it attempts to perform cell and/or band reselection based on cell reselection criteria appropriate to the active interface. If a cell is found (either the current cell or a new cell on the same air interface) that meets the suitable cell criteria, the MS returns to state 108 and camps on the current or new cell. If the "no suitable cell" criteria are met, however, the MS re-enters state 106, and may from there return to interface selection state 102 if necessary.

While the MS is in state 108, it may also begin monitoring of cells on the passive air interface when predetermined passive interface monitoring criteria are met, as described further hereinbelow. Based on measurements made on the passive interface, the MS assesses the necessity for interface reselection based on interface reselection criteria. If the criteria are met, the MS enters an interface reselection state 112. If a cell is found on the passive air interface that is preferable to the current, active cell, the MS enters a new interface cell selection state 113. If the new cell is successfully selected in this state, the MS goes directly to camping state 108. Alternatively, the MS returns to cell selection state 106 to select a new cell belonging to the new active interface. On the other hand, if the passive interface monitoring criteria are met, but the MS determines that there is no need for a interface reselection, the MS subsequently re-activates passive interface monitoring periodically, preferably using a hysteresis timer to prevent constant, rapid cycling, which runs down the MS battery.

As noted hereinabove, while MS 40 is idle in camping state 108, it is prepared to enter dedicated mode service in a connected state 115, after receiving an appropriate paging message or a service request from the upper MM and CM layers. Dedicated mode behavior of the MS is described in the U.S. patent applications described hereinabove and is beyond the scope of the present patent application. Upon termination of dedicated service, the MS returns to idle mode, preferably via a choose cell selection state 105 and, if necessary, via normal cell selection 106, followed by interface selection 102.

The description up to this point has related to interface and cell selection under conditions in which PLMN selection was successful. If this is not the case, the MS enters limited service mode, as described in the Background of the Invention, in which it attempts to select and camp on any PLMN, air interface and cell that will allow it to make emergency calls. Cell selection in this case is carried out via "any cell" selection state 117 or a "choose any" state 116 following a call in an emergency connect state 114. If the cell selection is successful, the MS camps on the selected cell in a camping state 109. Behavior of the MS is this state, in terms of cell and interface reselection and dedicated mode service when required, is largely similar to that described hereinabove with regard to normal service, subject to constraints imposed by the limited service. Likewise, states 114, 116, 118 and 119 associated with the limited service mode are similar to the corresponding normal service states 115, 105, 110 and 113, respectively. If the MS succeeds in selecting a PLMN, it returns to the appropriate, normal cell selection and camping states.

Figure 8A:
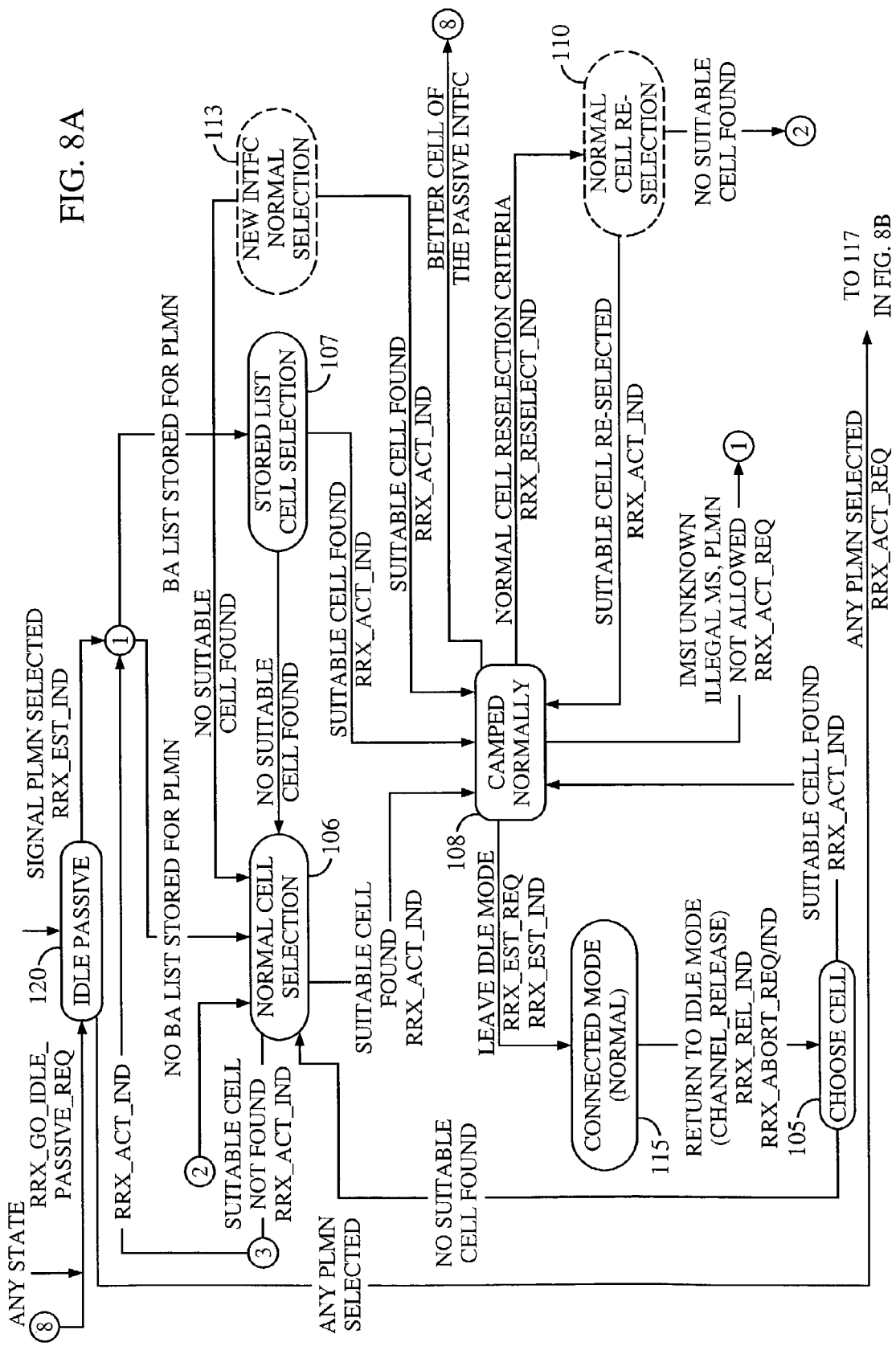
FIGS. 8A–8B and 9A–9B are flow charts illustrating idle mode processes carried out by the mobile station, in accordance with a preferred embodiment of the present invention.
Figure 8B:
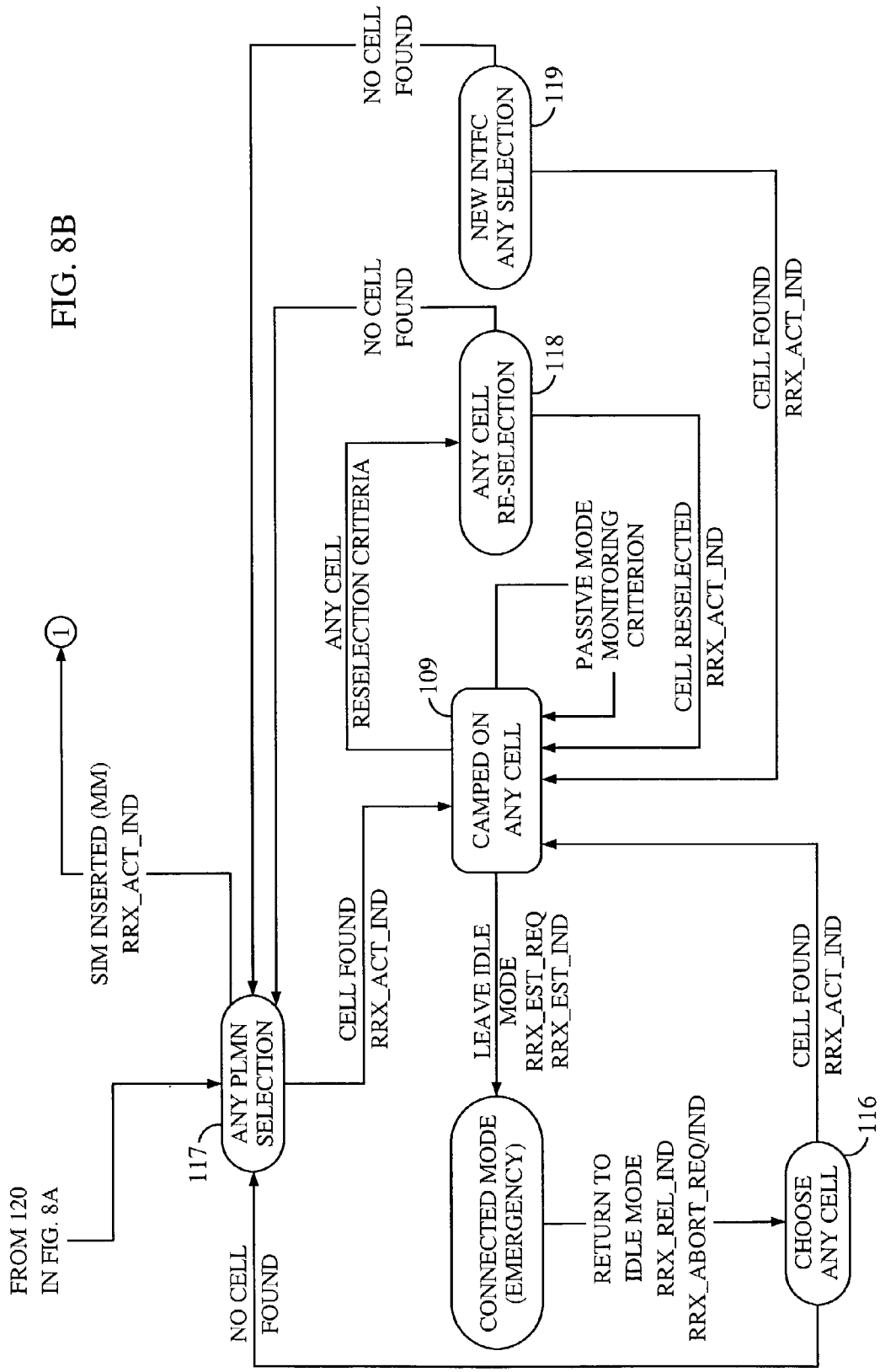

FIG. 8 is a flow chart illustrating behavior of the RRX processes (RRG process 80 and RRC process 82, as shown in FIG. 5 and described with reference thereto) during the idle mode operation of MS 40 illustrated in FIG. 7. To the extent appropriate, the states of the RRX process in FIG. 8 are identified by the same names and indicator numbers as the corresponding states of the MS in FIG. 7. Where appropriate in FIG. 8, state transitions are labeled with service primitives associated therewith, as listed in Appendix C.

Each of the RRX processes begins in an idle passive state 120, either when MS 40 is turned on or following selection of the RRX process to be the active one. While in the passive state, the RRX process periodically monitors cells over its corresponding air interface, when instructed by the RRCO process to do so. In response to a RRX_ACT_REQ message from the RRCO process, the RRX process becomes active, and the MS enters the appropriate cell selection state 106, 107 or 117. From this point on, as long as the RRX process is active, its behavior and state transitions essentially mirror the MS idle mode behavior and states shown in FIG. 7. When it is determined, however, that the other, passive air interface should become the active one, the RRCO process passes a RRX_GO_IDLE_PASSIVE_REQ message to the RRX, which then returns to idle passive state 120, regardless of the state that the RRX was in beforehand.

Figure 9A:
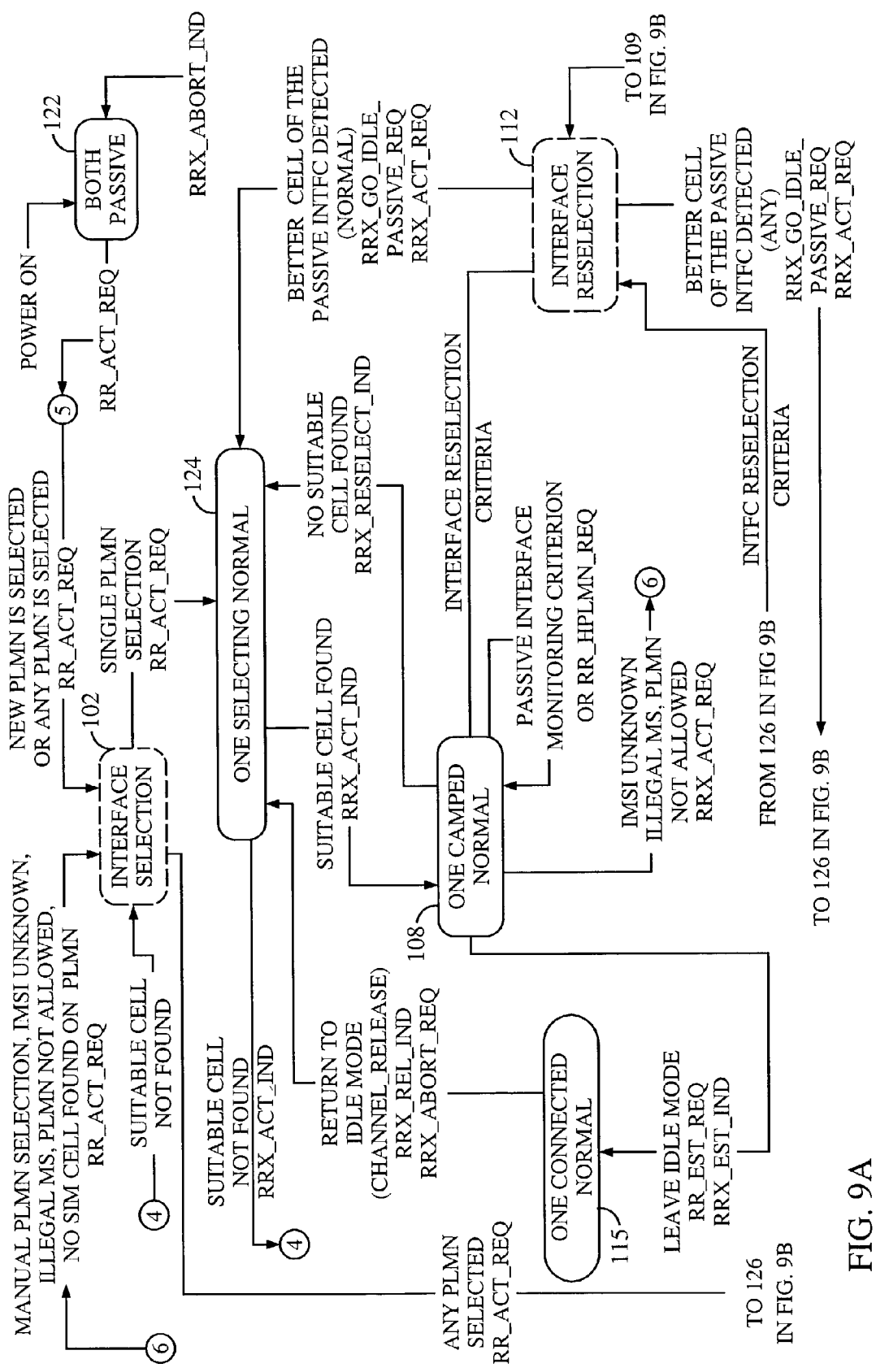
Figure 9B:
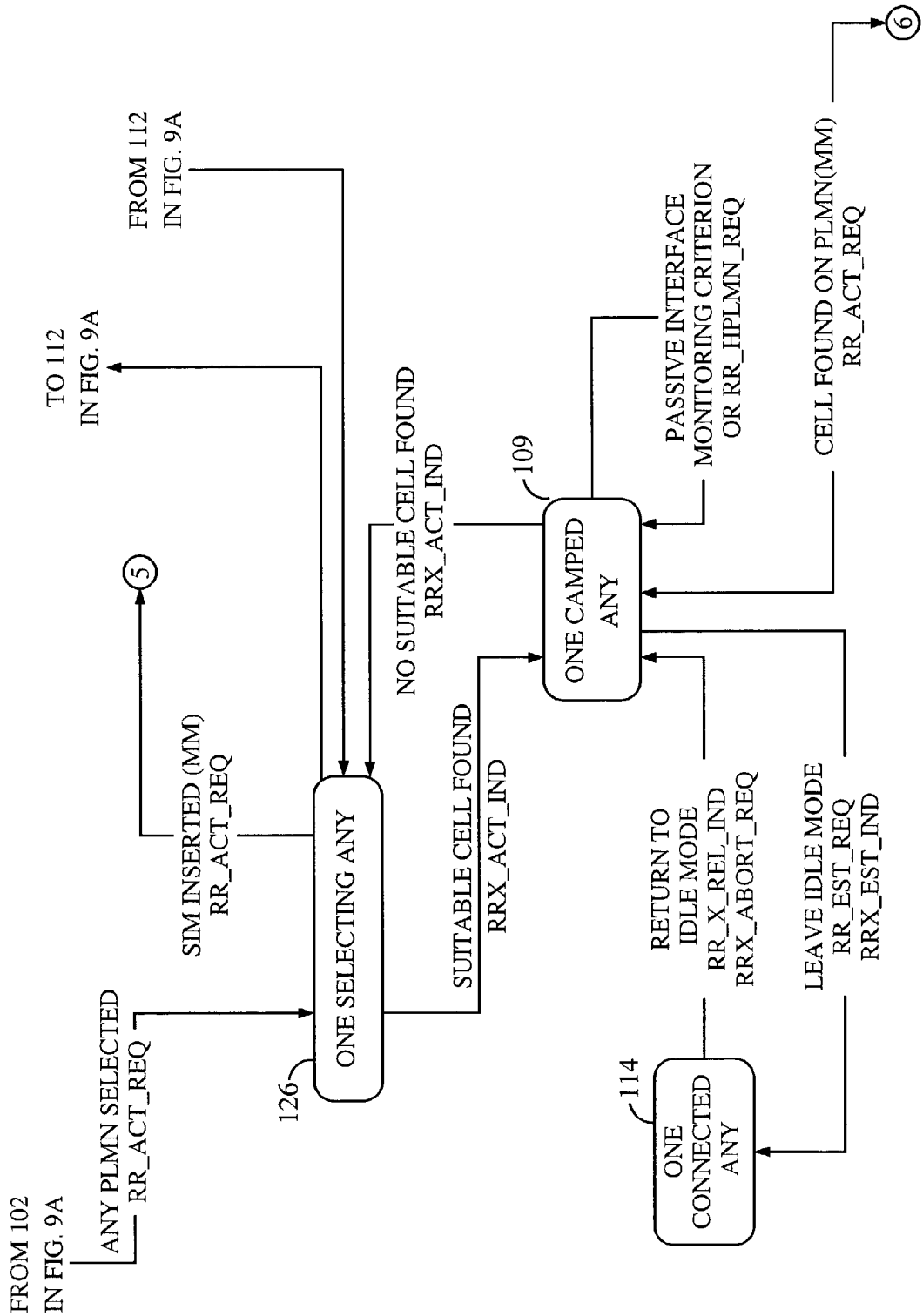

FIG. 9 is a flow chart illustrating behavior of the RRCO process during the idle mode operation of MS 40 illustrated in FIG. 7. Here, too, to the extent appropriate, the states of the RRCO process in FIG. 9 are identified by the same names and indicator numbers as the corresponding states of the MS in FIG. 7. Wherever appropriate in FIG. 9, state transitions are labeled with service primitives associated therewith, as listed in Appendix C, including both the RR_SAP primitives and the RRCO-RRX primitives.

As noted earlier, when the MS is switched on, RRCO begins in a state 122 in which both of the RRX processes are passive. When the RRCO process receives a RR_ACT_REQ primitive from an upper protocol layer, it enters interface selection state 102. Once the air interface is selected, the active RRX process then goes on to select a cell, while the RRCO process waits in an appropriate "one selecting" state 124 or 126 (depending on whether a PLMN was selected, or alternatively, whether the MS is operating in limited service mode, as described hereinabove). When a cell is selected, the RRCO process enters a "one camped" state, corresponding to camped states 108 or 109 of the MS.

In these camped states, RRCO intermittently invokes passive air interface monitoring by the passive RRX process, based on monitoring criteria described hereinbelow. When the interface reselection criteria are met, the RRCO process passes to interface reselection state 112, and from there back to selecting state 124 or 126. At this point the passive and active RRX processes have switched, but the states of RRCO are the same regardless.

procedures for gsm/cdma cell selection and camping

Certain of the states and processes illustrated in FIGS. 7–9, associated with the cell selection/reselection and camping processes, will now be described in greater detail. Aspects of the operation of MS 40 that are entirely in accordance with GSM specifications or that can be derived from GSM specifications in a straightforward manner are omitted.

Figure 10A:
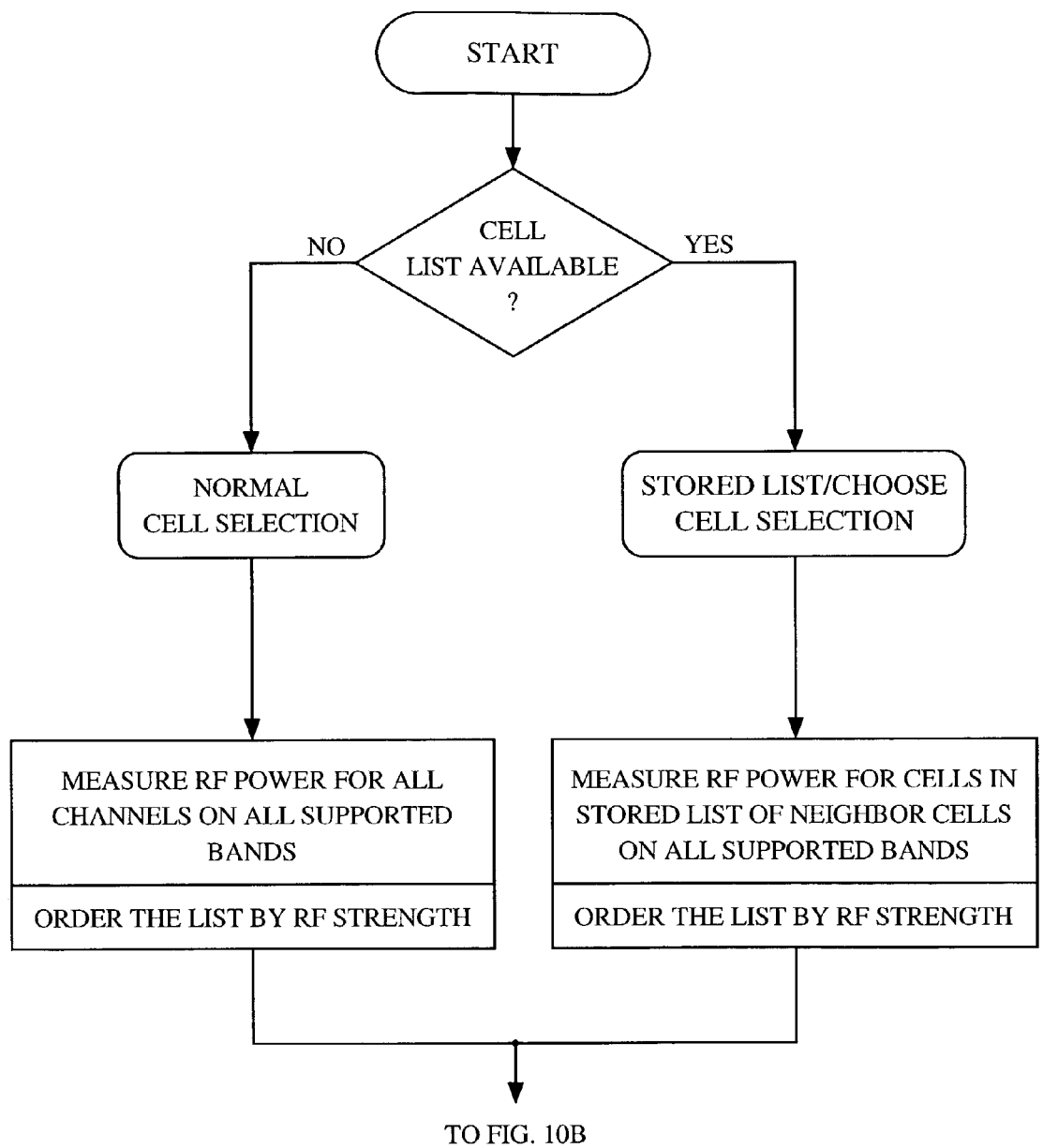
FIGS. 10A and 10B are flow charts illustrating methods of idle mode cell selection, in accordance with a preferred embodiment of the present invention.
Figure 10B:
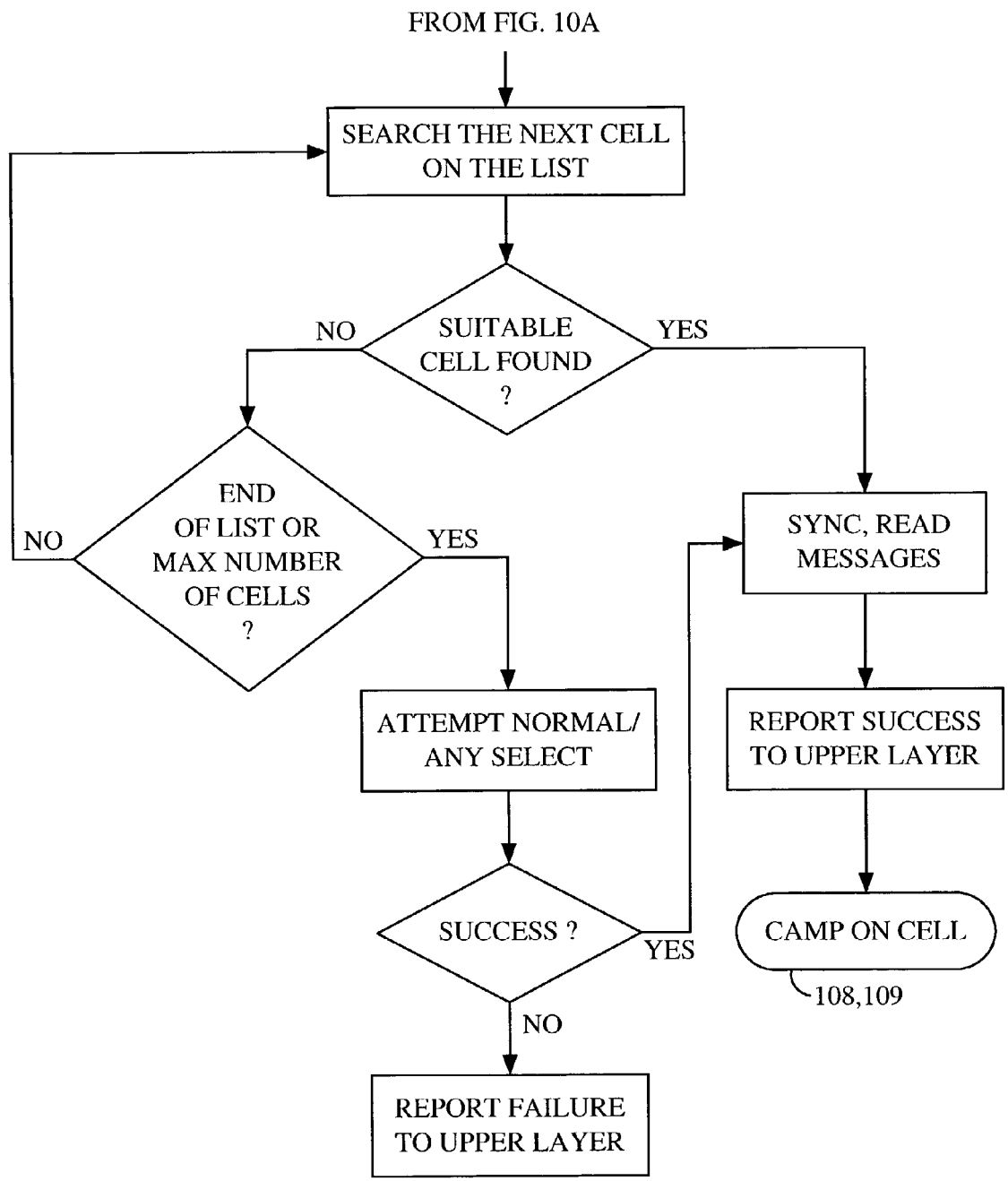

FIGS. 10A and 10B are flow charts that schematically illustrate procedures associated with cell selection states 105, 106 and 107, when the CDMA air interface has been selected, in accordance with a preferred embodiment of the present invention. The procedures generally apply, as well, in the corresponding "any cell" selection states in the limited service mode. Similar procedures are followed for cell selection over the GSM/TDMA air interface, in accordance with GSM standards, but different parameters and decision criteria are involved.

MS 40 scans the spectrum of CDMA frequencies in all supported frequency bands, in order to detect strong pilot signals and to build a list of the pilots in order of measured RF power. The list of cells whose frequency the MS scans can include neighbor cells in the last serving PLMN (stored list cell selection state 107), neighbor cells monitored during the last connection (choose cell selection state 105) or all supported CDMA Frequency Assignments (CFAs) in all supported bands of operation (normal cell selection state 106). Preferably, the MS maintains a list of "forbidden location areas (LAs) for roaming," which is updated whenever the MS is informed that a particular LA is forbidden, in accordance with GSM standards. The MS does not attempt to receive service in cells belonging to the forbidden LAs.

The MS then searches the cells on the list in order. If the cell fulfills the "suitable cell criteria" defined hereinbelow, the MS camps on that cell. Otherwise, it attempts to select the next cell on the list.

If the MS reaches the end of the list, or when the "no suitable cell criteria" are fulfilled in stored list or choose cell selection, it attempts normal cell selection, or "any cell" selection (state 117) if in limited service mode. If this, too, is unsuccessful, the cell selection process returns to interface selection state 102.

Preferably, in accordance with IS-95 standards, after finding a suitable pilot channel of a CDMA cell, the MS then attempts to receive a valid sync channel message from the cell. The MS synchronizes its long code and system timing to those of the CDMA cell, using PILOT_PN, LC_STATE, and SYS_TIME values derived from the received sync channel message. It then reads the full set of system overhead messages on the paging channel of the cell. If the MS receives a page before having decoded the full set of messages, it preferably stores the page and responds after all of the messages have been decoded, provided that the response is not barred for any reason.

Optionally, MS 40 performs band selection in conjunction with cell selection, generally as provided by GSM standards. Candidate cells searched in stored list cell selection, as described above, may belong to one band or to multiple frequency bands. In normal cell selection, on the other hand, the MS searches all channels in all supported bands of operation in order of their respective RF signal strengths, using a predefined order of band preference. For purposes of CDMA band selection, MS 40 preferably refers to one or more preference lists:

Last active band and CDMA frequency assignment (CFA, maintained in the extended memory on SIM 44 by the MS).

A list of preferred CDMA bands and CFAs (stored in extended memory on SIM 44 of the MS).

A list of supported CDMA bands (pre-configured in the MS).

In stored list cell selection, associated with state 107 (FIG. 7), MS 40 refers to a predefined neighbor list, for example, a list of carrier frequencies defined by their CDMABAND and CDMACH parameters, in accordance with the IS-95 standard, for the selected PLMN. Preferably, the neighbor list is one that was provided to the MS by the last-used PLMN and stored in the memory on the extended SIM, as described hereinabove, or in a non-volatile memory of the MS. If there is a valid Location Area Identifier (LAI) stored in the SIM, then the neighbor list must belong to the PLMN indicated by the LAI. In the course of searching and attempting to camp on the cells in the list, if the MS is able to decode the messages of a cell of the selected PLMN but cannot camp on the cell, the neighbors of that cell are preferably added to the list.

When selecting a cell in "choose cell" selection state 105, the MS preferably attempts to camp on the last serving cell from the period that the MS was operating in dedicated mode. If the last serving cell is known to be unsuitable (i.e., it fails to meet the "suitable cell criteria" described hereinbelow), then the MS can attempt to camp on any of the surrounding cells. For the purpose of ordering the list of surrounding cells, the MS preferably measures the power on the traffic channels of each of the cells while in dedicated mode, averaging the measurements over a predetermined period, typically 5 sec. If the full set of overhead messages for the selected cell was already decoded shortly before selection, for example, within the preceding 30 sec, then it is generally not necessary for the MS to decode them again, contrary to what is indicated in FIG. 10B. Furthermore, when the MS is requested to re-establish an interrupted call, the time required for cell selection is preferably shortened by omitting non-essential steps in the cell selection method.

In new interface cell selection state 113, cell selection is preferably performed in a manner generally similar to that in choose cell state 105. The similarity is made possible if in the course of monitoring the passive air interface before the interface reselection, the MS made power measurements of neighbor cells. These measurements are used to assemble the list from which the new serving cell is selected.

Cell selection in limited service, carried out in "any cell" selection state 117, "choose any" state 116, and "new interface any" selection state 119, is largely similar to the parallel, respective normal cell selection state 106, choose cell state 105 and new interface normal selection state 110, with changes as required for limited service operation.

Figure 11:
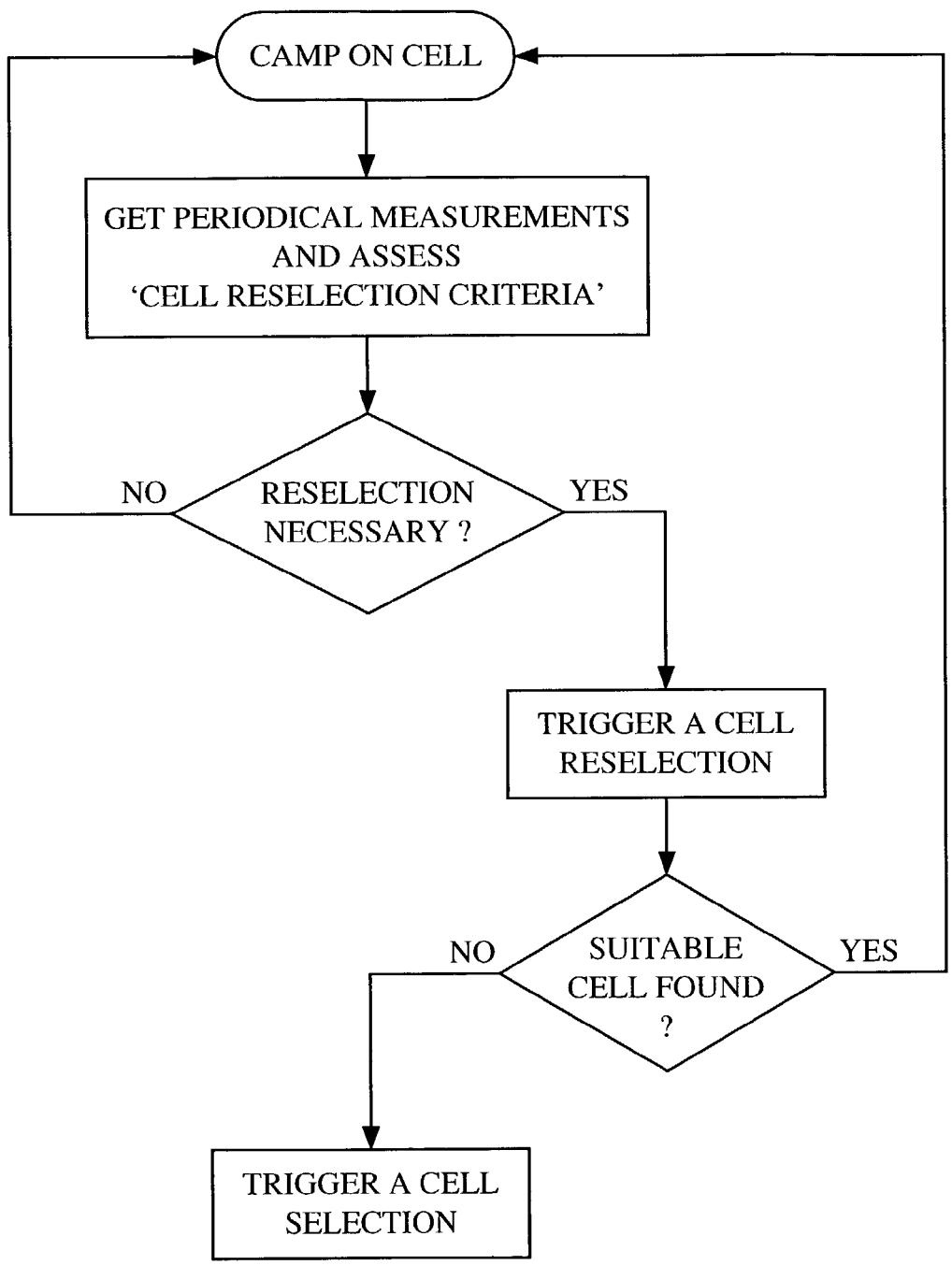
FIG. 11 is a flow chart illustrating a method of idle mode cell reselection, in accordance with a preferred embodiment of the present invention.

FIG. 11 is a flow chart that schematically illustrates cell reselection procedures followed by MS 40, in accordance with a preferred embodiment of the present invention. While camped on a cell, MS 40 periodically measures signal strengths or qualities of neighboring cells. The neighboring cells are preferably searched in accordance with a list of neighbor channels that is broadcast by the serving cell. The MS attempts to acquire the cell with the best available pilot. The MS then determines whether reselection is necessary based on "cell reselection criteria," as described hereinbelow.

When the criteria are met, the MS triggers a cell reselection. Before camping on the new cell, the MS preferably decodes the full set of overhead messages and evaluates the cell parameters. If the new cell is listed in a neighbor list parameters message broadcast by the old cell, the MS can preferably make a pilot-to-pilot transition, skipping decoding of the sync channel, as defined by the IS-95 specification. Otherwise, the sync channel message of the new cell is preferably decoded first. Once it has acquired the new cell, the MS preferably operates in a non-slotted mode, as provided by the IS-95 specification, until it has received at least one valid message on the new paging channel. The MS then camps normally on the new cell.

If after beginning reselection, the MS fails to find a suitable cell within a predetermined period, preferably about 10 sec, it returns to normal cell selection state 106.

It is noted that the description above applies generally to both normal cell reselection, associated with state 110, and "any cell" reselection, associated with state 118 in limited service mode, with appropriate changes to the reselection criteria.

Cell selection and reselection over the CDMA air interface are preferably based on a CDMA path-loss criterion (C1c) and a reselection criterion (C2c). The path-loss criterion is used to determine whether the MS can communicate with the network without interference, i.e., whether the MS is located within an area of good coverage by the cell in question. The reselection criterion is used to determine a relative quality level of candidate cells so as to find the best cell available. It uses C1c and additionally takes into account a cell priority allocated by the network (CELL_RESELECT_OFFSET).

C1c is given by the total received power spectral density at the antenna connector of MS 40, measured for the pilot of a particular cell:

$$C1c = -20\log_{10}(E_c/I_o),$$

Wherein it is preferable that:

$$C1c > EC\_IO\_THRESH$$

The terms $E_c$, $I_o$ and EC_IO_THRESH are taken from the IS-95 standard, wherein $E_c/I_o$ is the ratio in dB between the pilot energy accumulated over one PN chip period ($E_c$) to the total power spectral density ($I_o$) in the received bandwidth.

Furthermore, for a cell to be selected, the pilot power preferably satisfies:

$$\text{Pilot\_power} > EC\_THRESH - 115,$$

wherein Pilot_power (in dBm/1.23 MHz) is defined as follows:

$$\text{Pilot\_power} = -20 \log_{10}(E_c/I_o)(\text{dB}) + \text{mean input power (dBm/1.23 MHz)}$$

Preferably, the values of EC_IO_THRESH and EC_THRESH are broadcast to MS 40 as part of a CDMA extended system parameters message.

The reselection criterion C2c for CDMA is defined as:

$$C2c = C1c - \text{CELL\_RESELECT\_OFFSET}$$

CELL_RESELECT_OFFSET is a cell reselection parameter similar to one used in GSM, which is preferably broadcast in the cell, as provided by GSM standard 05.08.

When a neighboring cell has a higher value of C2c than the current serving cell for a predetermined time period, typically 5 sec, cell reselection is invoked, so long as the neighboring cell is in the same location area as the serving cell. For a neighbor belonging to the same air interface but having a different location area, the condition is preferably:

$$C2c(\text{new cell}) > C2c(\text{current cell}) + CRH$$

wherein CRH is a cell reselection hysteresis factor, added to prevent too-frequent location area changes, which consume substantial battery power in the MS. Use of this criterion requires that the MS be aware that the neighboring cell belongs to a different location area. In preferred embodiments of the present invention, there are two alternative ways by which the MS can gain awareness of the location area of the neighboring cell:

The neighbor list broadcast by the current serving cell can include location area information.

The MS can store in memory the location areas of cells that have served it in the past, for later reference in cell reselection.

Similarly, if there has been a recent cell reselection, additional constraints are preferably placed on the reselection criteria. For example, if a reselection took place within the past 15 sec, C2c of the new cell is required to exceed C2c of the current cell by at least 5 dB for 5 sec, and the MS should not return to the same cell within 4 sec if another suitable cell can be found. In any event, the neighboring cell that is to be selected must also satisfy the path-loss requirements imposed on C1c and on the pilot power.

While operating over the CDMA interface, MS 40 will preferably select only cells meeting the CDMA suitable cell criteria. The criteria are based generally on suitable cell criteria defined by the GSM standard. A cell is suitable for the MS to camp on if it fulfills all of the following conditions:

The cell satisfies the requirement described above regarding the C1c path-loss criteria; and The MS is able to detect the pilot channel signal of the cell within a predetermined period, preferably about 15 sec; and The MS receives a valid message on the cell's sync channel within a predetermined period, preferably about 1 sec; and The MS is able to read the full set of overhead messages of the cell within a predetermined period, preferably about 4 sec; and The cell belongs to the selected PLMN (or, when in limited service mode, the cell belongs to any PLMN and supports emergency calls); and The cell is not barred (i.e., the MS is permitted to access the cell); and The cell is not in the "forbidden LAs" list, as described hereinabove; and The cell has a normal priority allocated, as defined by GSM standards, unless a predetermined number of channels have already been searched, and all suitable cells have low priority as determined by a CELL_BAR_QUALIFY parameter broadcast by the network. Preferably, five channels per CFA are searched before low-priority cells are admitted.

Cell reselection is also invoked if the serving cell itself does not fulfill the above criteria; or if the paging channel of the serving cell is lost for a predetermined period of time, typically several seconds; or if a service attempt on the access channel of the serving cell has failed.

The "no suitable cell" criterion for the CDMA air interface is likewise based on the criterion used in GSM: In normal cell selection state 106 and "any cell" selection state 117, the MS gives up searching for cells belonging to the current air interface after having searched a predetermined number of RF channels, and finding none that fulfill the suitable cell criteria. In the other cell selection states shown in FIG. 7, which use predetermined lists of cells, when the MS reaches the end of the list of cells associated with the state, as described hereinabove, it enters state 106 or 117, as appropriate, in order to continue the search.

While in normal camping state 108, MS 40 preferably performs the following activities:

The MS monitors the paging channel of the serving cell and indicates to the upper MM protocol layer of the MS if the paging channel becomes unavailable.

The MS decodes the broadcast system overhead messages of the serving cell and indicates to the upper layer any changes in the broadcast of relevant parameters.

While camped on a cell and having a valid SIM 44 inserted, the MS listens to all paging messages that could be addressed to it, as required by GSM standard 05.02.

The MS listens for cell broadcast messages subscribed to by the user, in accordance with the principles of GSM short message service (SMSCB), particularly as described in the above-mentioned U.S. patent application Ser. No. 09/365, 963.

The RR layer in the MS accepts service requests from the upper layer of the MS and indicates to the upper layer if there is a failure to access the cell.

The MS periodically assesses the cell reselection criterion, as described above, and initiates cell reselection if necessary.

Furthermore, the MS also initiates cell reselection if one of the other relevant criteria described above is realized, for example, if the current serving cell becomes barred, or if there is a downlink signaling failure.

In national roaming, in accordance with GSM standards, the MS supports periodical home PLMN (HPLMN) search.

The MS generates a list of available PLMNs when so requested by the upper layer, preferably generating the list in a way that minimizes interruptions in monitoring of the paging channel by the MS.

The MS preferably supports dual-interface monitoring and air interface reselection, as described hereinbelow. When appropriate, based on passive interface monitoring criteria, the MS initiates signal strength measurements over the passive air interface (passive interface monitoring) in order to determine whether interface reselection is called for.

Once passive interface monitoring has been initiated, the MS periodically assesses appropriate interface reselection criteria and initiates interface reselection when appropriate.

Preferably, one of the air interfaces is designated in the memory of the MS (in the extended SIM or in integral, non-volatile memory) as the preferred interface. In this case, when the MS camps on a cell belonging to the non-preferred interface, it preferably runs an interface search timer and performs a periodic interface search even when other interface reselection criteria are not met.

In "any cell" camped state 109, as noted hereinabove, the MS camps on any cell from which emergency calls can be made if necessary. In this state, the MS performs cell reselection similar to that associated with normal camped state 108, except that the hysteresis parameter CRH is preferably set to zero. If the MS has a valid SIM (despite being in the limited service mode), it intermittently searches for available and allowable PLMNs, as described generally in GSM standards 03.22 and 02.11.

Air Interface Selection and Reselection

Figure 12:
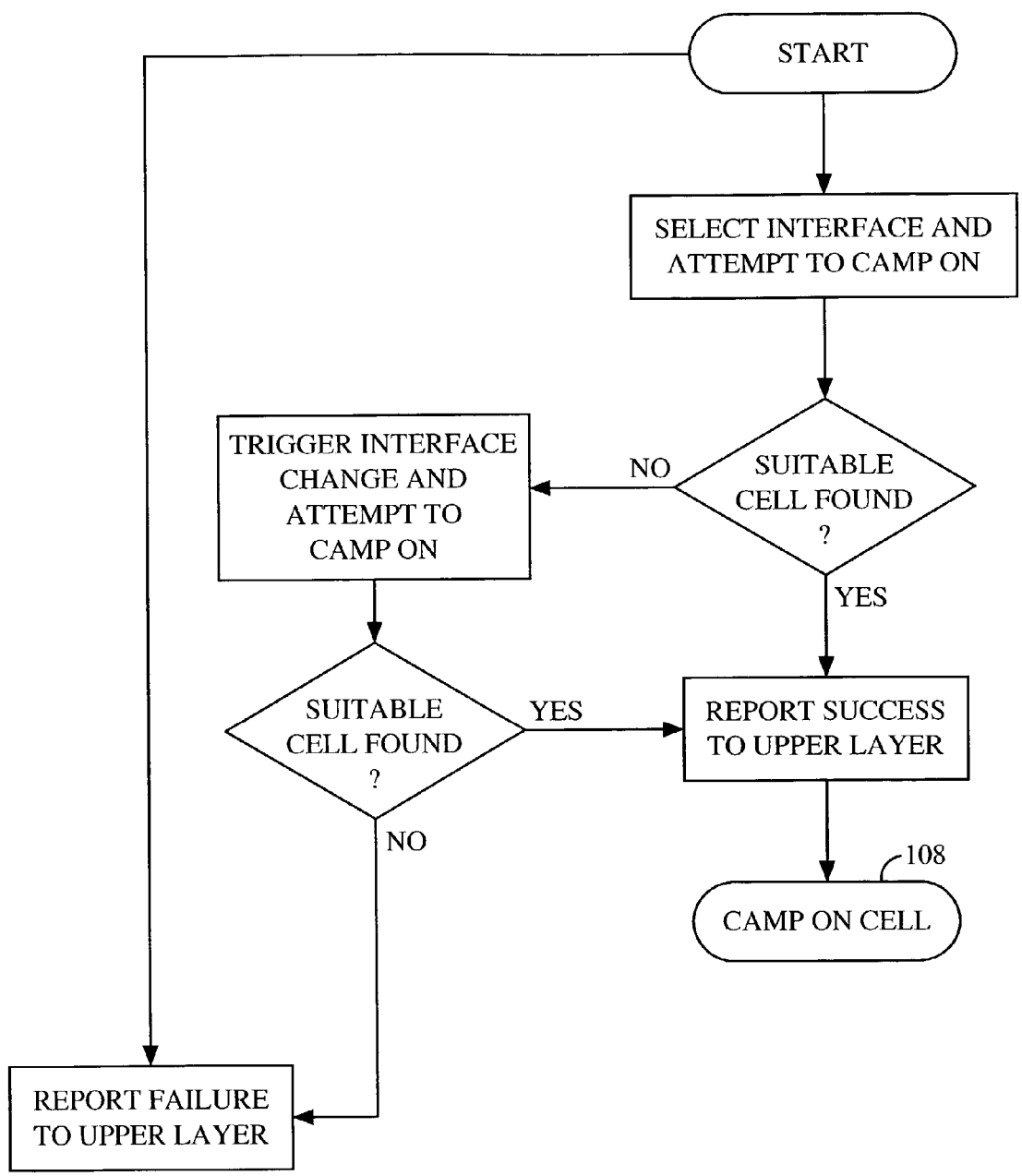
FIG. 12 is a flow chart illustrating a method of air interface selection, in accordance with a preferred embodiment of the present invention.

FIG. 12 is a flow chart that schematically illustrates air interface selection procedures followed by the MS, in accordance with a preferred embodiment of the present invention. Air interface selection is invoked whenever a new PLMN is selected (by the MM sub-layer) or when no suitable cell is found on the active air interface during normal cell selection.

The MS initially selects one of the air interfaces to be the active interface, and attempts to camp on a cell transmitting over that interface. Preferably, the MS selects the last active interface, when known. Otherwise, the MS selects the user's preferred interface as programmed on the SIM, or a default preferred interface as programmed on the non-volatile memory of the MS. Optionally, if the MS is located in an area in which it has no prior information regarding coverage by one air interface or another, the order of mode selection is preceded by an initial power measurement over both interfaces.

If unsuccessful in camping on a cell over the first air interface, the MS switches to the other air interface and seeks a suitable cell for camping there. Successful selection and camping are reported to upper (MM) protocol sublayer 56. Failure to find a cell to camp on over both interfaces is likewise reported to the MM sublayer, and the entire process is re-attempted at a later time.

After MS 40 has successfully selected an air interface and camped on a cell, air interface reselection is invoked when interface reselection criteria are met, as described hereinbelow. The criteria are assessed after the MS has first monitored the passive air interface, based on passive interface monitoring criteria, likewise described below. Upon interface reselection, the current active interface is preferably deactivated (and becomes the passive interface) before activating the new interface.

The passive interface monitoring criteria, in accordance with which the MS initiates passive interface monitoring, preferably includes all of the following conditions:

The network broadcasts an indication that neighbor cells on the passive air interface are available; and All cells received on the active interface have signal level below a predefined broadcast threshold for a predetermined period, preferably about 5 sec; and There are fewer than a predetermined minimum number of cells, preferably two cells, on the list of available neighbor cells over the active interface for a predetermined period of time.

Alternatively, the MS begins passive interface monitoring if a HPLMN search has been initiated, in accordance with GSM network standards, or if the interface search timer, described hereinabove, has expired while the MS is camped on a cell of the less preferred interface.

Following the activation of passive interface monitoring, the interface reselection criteria are assessed. If the criteria are met, interface reselection follows. Otherwise, passive interface monitoring is discontinued, and begins again after a predetermined hysteresis period (assuming that the above monitoring criteria are still met).

Figure 13:
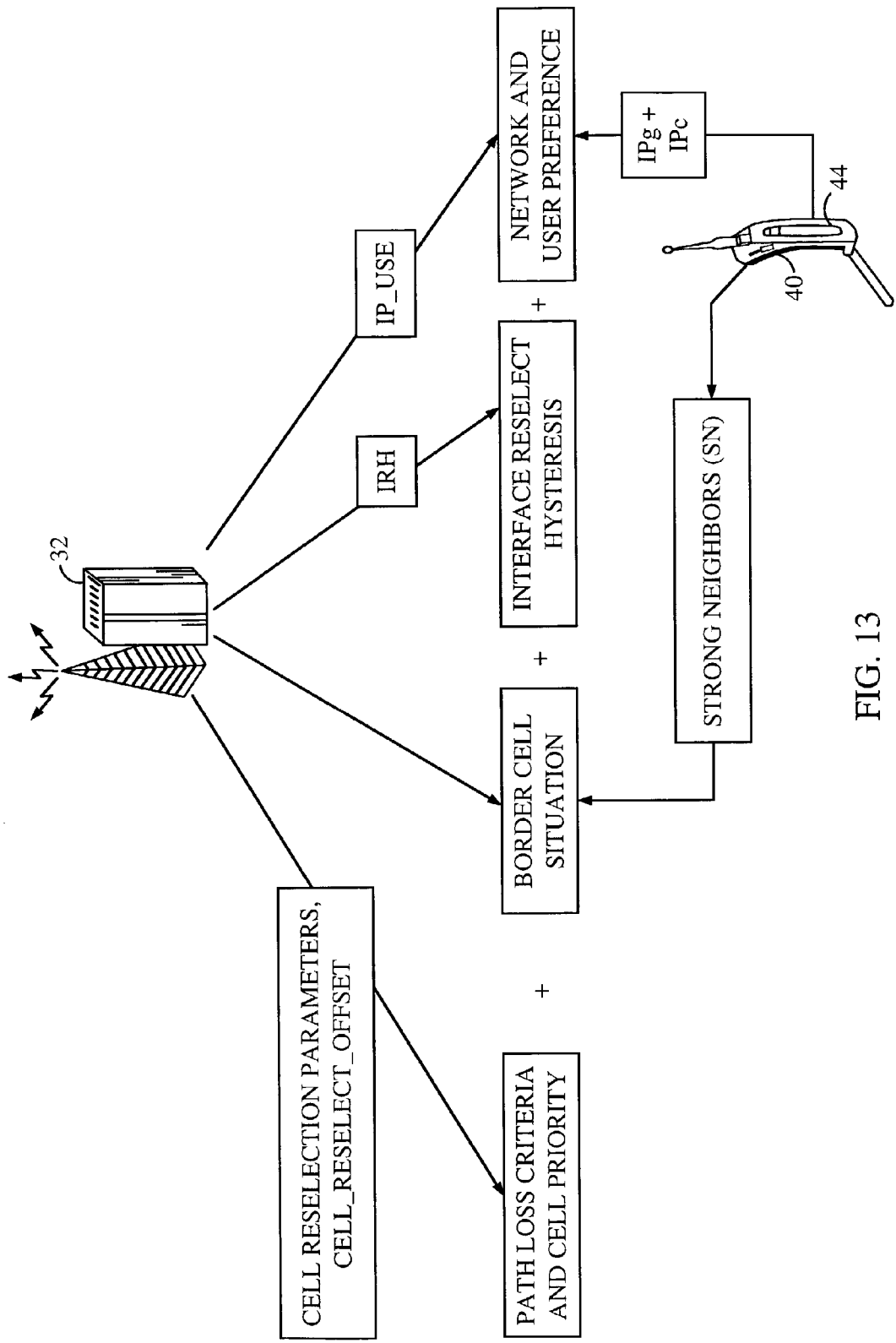
FIG. 13 is a block diagram that schematically illustrates decision criteria for determining whether reselection of the air interface is required, in accordance with a preferred embodiment of the present invention.

FIG. 13 is a diagram that schematically illustrates combined reselection criteria for use in determining whether an air interface reselection should take place, in accordance with a preferred embodiment of the present invention. The combined reselection criteria preferably includes the following parameters:

Interface priority (IP) to allow the prioritization of one air interface or the other;

Interface reselection hysteresis (IRH), to prevent frequent change between the interfaces;

Strong neighbors (SN) assessment, to take into account border cell situations (FIG. 2) and try to change the active interface before encountering abrupt end of coverage.

Some of these parameters are preferably broadcast by the network. When no such extended broadcast information is available, default values from extended SIM 44 in MS 40 are preferably used. Otherwise, default values stored in the memory of MS 40 apply.

Preferably, interface reselection is based on measurements by MS 40 of received RF power levels of strong neighbor cells. A "good interface" is one in which the strongest cell candidate (normally the serving cell) is received above a predetermined threshold. A "bad interface" is one in which all cells are received below the threshold, and there are less than the predetermined number (preferably two) of acceptable neighbors. Each of the active and passive air interfaces is classified on this basis as either "good" or "bad," and the decision as to reselection is preferably based on the following table:

TABLE 1

Combined Reselection Criteria based on Strong Neighbors

| Active ase Interface | Passive Interface | Action |
| --- | --- | --- |
| Bad | Bad | None |
| Bad | Good | Reselect interface |
| Good | Good | Reselect interface only if the passive mode has an advantage (i.e. a higher priority or HPLMN) |
| Good | Bad | None |

Alternatively or additionally, the decision regarding interface reselection is based on comparing path-loss values of the strongest cells over both interfaces as a measure of their relative quality. In this case, the decision to change from an active CDMA interface to GSM/TDMA is preferably based on the C1$c$ path loss criterion defined hereinabove and on a comparable GSM path loss criterion C1$g$. Reselection takes place if:

$C1g$(new intfc)+$IPg$>$C1c$(current intfc)+$IPc$+$IRHc$

On the other hand, the decision to change from an active GSM/TDMA interface to CDMA is taken if:

$C1c$(new intfc)+$IPc$>$C1g$(current infc)+$IPg$+$IRHg$

In these inequalities, IPg and IPc represent user preference values for the GSM/TDMA and CDMA interfaces, respectively, which are preferably stored in SIM 44. IRHg and IRHc are respective interface hysteresis factors, as described hereinabove. C1g(new intfc) is the GSM path loss criteria for the new air interface and C1c(current intfc) is the CDMA path loss criteria for the current air interface. Likewise, C1c(new intfc) is the CDMA path loss criteria for the new interface and C1g(current intfc) is the GSM path loss criteria for the current interface. The user preference parameters IPc and/or IPg are taken into account only when this is allowed by the network (preferably as indicated by a broadcast parameter IP_USE). Otherwise a priority parameter broadcast by the network is used. This approach has the advantage of supporting interface reselection based on a predefined interface priority, which a network operator can vary so as to adjust the distribution of MSs between the available interfaces. Optionally, a constant mapping factor is added to the inequalities to compensate for differences between the path-loss ranges of GSM/TDMA and CDMA.

Alternatively, passive interface monitoring is not used, and there is no indication given as to the existence of a better interface. In this case, interface reselection takes place only upon losing coverage of the current active interface. This approach has the disadvantage, however, that it gives no assurance that the MS will camp on the best available cell. Furthermore, the MS becomes non-pageable for a period of several seconds upon loss of coverage.

General Comments

Although preferred embodiments are described hereinabove with reference to a particular hybrid GSM/CDMA system, it will be appreciated that the principles of the present invention may similarly be applied to effect cell selection and reselection in other hybrid communication systems, as well. Moreover, although the preferred embodiments make reference to specific TDMA- and CDMA-based air interfaces and communications standards, those skilled in the art will appreciate that the methods and principles described hereinabove may also be used in conjunction with other methods of data encoding and signal modulation. Furthermore, the principles of the present invention, which are exemplified herein by reference to a hybrid system including two types of air interfaces (CDMA and TDMA), may be applied in a straightforward manner to hybrid systems including three or more different air interface types. The scope of the present invention encompasses not only the complete systems and communications processes described hereinabove, but also various innovative elements of these systems and processes, as well as combinations and sub-combinations thereof.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix A

Cellular Communications Standards

The following publications are incorporated herein by reference, as defining standards with which system 20 generally and MS 40 particularly preferably comply. Standards listed hereinbelow are cited at the appropriate places in the present patent application.

TIA/EIA-95-B: Mobile Station-Base Station Compatibility Standard for Dual-Mode Spread Spectrum Systems.

TIA/EIA IS 98-B, May 13, 1998: Recommended minimum performance for dual-mode spread spectrum cellular mobile stations.

ETS 300 504: Phase 2 Types of mobile stations (GSM 02.06).

ETS 300 507: Phase 2 Service accessibility (GSM 02.11).

ETS 300 509: Phase 2 Functions related to Subscriber Identity Module—Functional characteristics (GSM 02.17).

ETS 300 535: Phase 2 Functions related to Mobile Station in idle mode (GSM 03.22).

ETS 300 556: Phase 2 Mobile radio interface signaling layer 3-General aspects (GSM 04.07).

ETS 300 557: Phase 2 Mobile radio interface layer 3 specification (GSM 04.08).

ETS 300 574: Phase 2 Multiplexing and multiple access on the radio path (GSM 05.02).

ETS 300 577: Phase 2 Radio transmission and reception (GSM 05.05).

ETS 300 578: Phase 2 Radio system link control (GSM 05.08).

ETS 300 608: Phase 2 Specification of the SIM-ME interface (GSM 11.11)

Appendix B

Definition of Terms and Abbreviations

This appendix lists and defines certain technical terms and abbreviations, which are used in the context of the present patent application and in the claims. Although the terms and abbreviations are explained in the body of the disclosure or are otherwise familiar to those skilled in the art, they are repeated here for the convenience of the reader:

The term PLMN (public land mobile network) refers to a cellular network. We distinguish between the home PLMN (HPLMN) and the visited PLMN (VPLMN), as are known in GSM cellular systems.

The serving cell is the cell the mobile station (MS) chooses to camp on. Neighbor cells are cells that are located in the vicinity of the serving cell and are declared to be neighbors by the PLMN.

"Camping on" a cell refers to tuning the mobile station receiver to the broadcast channels of the cell, maintaining certain cell parameters in the mobile station memory, and monitoring the paging channel of the cell.

"Air interface" refers to a set of interfaces and protocols used to establish cellular communications. We distinguish between the GSM (or TDMA) air interface and the CDMA air interface.

The term "GSM/CDMA System" refers to a cellular system supporting dual-air interface operation.

The term mode is used in the following context:

Idle Mode—The mode of operation wherein no network radio resources are explicitly allocated, and the mobile station attempts to choose and camp on the most adequate cell and to receive the common broadcast channels thereof.

Dedicated Mode—The mode of operation wherein the mobile station is connected to the network or accessing the network to establish a service connection. In dedicated mode, the mobile station is transmitting and receiving on channels specifically allocated by the network.

| ABBREVIATIONS | |
|---|---|
| Ba list | BCCH allocation list of cells |
| BCCH | Broadcast Common Control Channel |
| Bit/s | Bits Per Second |
| BS | Base Station |
| BSC | Base Station Controller |
| BSS | Base Station Subsystem |
| BTS | Base Transceiver Station |
| CB | Cell Broadcast |
| CBC | Cell Broadcast Center |
| CBCH | Cell Broadcast Channel |
| CBE | Cell Broadcast Entity |
| CC | Call Control |
| CFA | CDMA Frequency Assignment |
| CGI | Cell Global Identity |
| CM | Call Management |
| CRH | Cell Reselection Hysteresis |
| dB | Decibel |
| dBm | dB milliwatt |
| DRX | Discontinuous receive mode |
| GPRS | Global Packet Radio Service |
| GSM | Global System for Mobile Communications |
| HLR | Home Location Register |
| HPLMN | Home PLMN |
| IMSI | International Mobile Subscriber Identity |
| IS | Interim Standard |
| L1 | Layer 1 |
| L2 | Layer 2 |
| L3 | Layer 3 |
| LA | Location Area |
| LU | Location Update |
| MCC | Mobile Country Code |
| ME | Mobile Equipment |
| MNC | Mobile Network Code |
| MM | Mobility Management |
| MS | Mobile Station |
| MSC | Mobile Switch Center |
| NV_MEM | Non Volatile Memory |
| PAM | Paging Access Manager |
| PLMN | Public Land Mobile Network |
| RIL | Radio Interface Layer |
| RPLMN | Registered PLMN |
| RR | Radio Resource management |
| SACCH | Slow Associated Control Channel |
| SAP | Service Access Point |
| SDCCH | Stand-alone Dedicated Control Channel |
| SMS | Short Message Service |
| SMSCB | Short Message Service Cell Broadcast |
| VLR | Visitors Location Register |
| VPLMN | Visited PLMN |

Appendix C

Rr Sublayer Interfaces, Primitives and State Variables

This appendix describes aspects of GSM/CDMA RR sublayer 55 of signaling layer 3, as shown in FIGS. 3–5, in accordance with a preferred embodiment of the present invention. The description covers only services associated with the idle mode of MS 40 and does not cover primitives that are relevant only for dedicated mode, which are beyond the scope of the present patent application.

C1. The MM-RR Service Interface

The RR Combiner process (RRCO 84) implements a standard interface (RR-SAP 90) between the RR and MM sublayers of layer 3. The interface is in accordance with GSM 04.07, substantially without modification.

C2. The RRCO-RRX Service Interface

The primitives defined in this section are a superset of GSM 04.07. The definition reuses the MM-RR primitives described hereinabove and adds new primitives to support the internal communication between the RRCO and RRX processes. (RRX is used herein as a collective term for RRG 80 and RRC 82.) To avoid redundancy in this appendix, please refer to the definition of the RR-MM Service Interface in the GSM standard for details of identical service primitives and parameters.

C2.1. RRCO-RRX Service Primitives

TABLE C-3

| RRCO-RRX Service Primitives | |
|---|---|
| PRIMITIVES | PARAMETERS |
| RRX_ABORT_IND | As RR_ABORT_IND |
| RRX_ABORT_REQ | As RR_ABORT_REQ |
| RRX_ACT_IND | As RR_ACT_IND |
| RRX_ACT_REQ | RrxReselectionParameters, RrxReselectionOptions |
| RRX_BCCH_INFO_IND | As RR_BCCH_INFO_IND |
| RRX_EST_CNF | As RR_EST_CNF |
| RRX_EST_IND | As RR_EST_IND |
| RRX_EST_REQ | As RR_EST_REQ |
| RRX_EXT_NBC_INFO_IND | ExtNbcInfo, ExtModeInfp |
| RRX_GO_IDLE_PASSIVE_REQ | — |
| RRX_HPLMN_REQ | As RR_HPLMN_REQ |
| RRX_IDLE_PASSIVE_CNF | — |
| RRX_INFO_REQ | RrxCampedOptions |
| RRX_PLMN_LIST_CNF | As RR_PLMN_LIST_CNF |
| RRX_PLMN_LIST_REQ | — |
| RRX_REL_IND | As RR_REL_IND |
| RRX_SAMPLE_IND | NbrCellSamples |
| RRX_SAMPLE_REQ | SampleOptions, ExtNbcList, SleepDuration |
| RRX_SLEEP_IND | SleepStartTime, SleepDuration |

RRX_GO_IDLE_PASSIVE_REQ A request from RRCO to RRX to change from the active to the passive state.
RRX_IDLE_PASSIVE_CNF A confirmation from RRX to RRCO of deactivation of the lower layers. By sending this primitive, RRX confirms it is ready to accept RRX_SAMPLE_REQ.
RRX_SLEEP_IND Indication from the active RRX to RRCO upon entering the sleep period for the paging group in discontinuous receive operation (or slotted mode for CDMA).
RRX_EXT_NBC_INFO_IND This primitive is used by RRX to provide RRCO with broadcast information on neighbor cells of the other air interface.
RRX_SAMPLE_REQ A request from RRCO to RRX to perform an elementary cell measurement operation within a predefined time frame
RRX_SAMPLE_IND In the passive state, this primitive is used to respond to RRX_SAMPLE_REQ. When the MS camps on a cell in idle mode, it is used to provide unsolicited periodical reports of the reselection parameters for the serving cell and strongest neighbor cells.

C2.2. The RRCO-RRX primitive parameters

TABLE C-4

| RRCO-RRX Primitive Parameters | |
|---|---|
| PARAMETER NAME | DESCRIPTION |
| ExtModeInfo | A structure containing interface-specific parameters: Interface preference parameters Interface reselection parameters |
| ExtNbcInfo | A structure containing extended information concerning neighbor cells belonging to the other air interface and interface-specific parameters: NBC_DESCR SYS_TIME (only for CDMA) NCC_PERMITTED (only for GSM/TDMA) |
| ExtNbcList | A structure containing a list of neighbor cells for making measurements over the passive interface. |
| NbrCellSamples | Cell reselection parameters for one or more neighbor cells. This is an array containing for each neighbor cell: NBC_DESCR C1 (pathloss criterion) |

TABLE C-4-continued

RRCO-RRX Primitive Parameters

| PARAMETER NAME | DESCRIPTION |
|---|---|
| RrxCampedOptions | A structure containing the parameters of the serving cell. |
| RrxReselectionOptions | A structure containing the cell selection parameters: IGNORE_FORBIDDEN_LAI_LIST |
| RrxReselection Parameters | A structure containing the cell selection parameters: Plmn_OrAny Ba_List |
| SampleOptions | Used in the passive state of idle mode to define the type of measurement to make (i.e. RF power, synchronization, cell information, extended neighbor cell information). |
| SleepDuration | The duration of the sleep period in the camped state of the active RRX process, which can be used to make one or more measurements using the other (passive) RRX. |
| SleepStartTime | The starting time of the sleep period of the active RRX. |

The invention claimed is:

1. In a mobile wireless telecommunications system, which includes base stations of a first type operating over a first air interface, and base stations of a second type operating over a second air interface, a method for reselection by a mobile station camped on a cell associated with a first base station, which is of the first type, of a second base station, which is of the second type, comprising:

receiving signals over the second air interface from the second base station;

evaluating a characteristic of the signals;

responsive to the characteristic, selecting the second base station in place of the first base station; and camping on a cell associated with the second base station, wherein receiving the signals comprises initiating monitoring of signals over the second air interface responsive to an indication that a predetermined monitoring criterion has been met; and wherein the mobile station attempts to receive signals from a plurality of candidate cells over the first air interface, and wherein initiating the monitoring comprises initiating monitoring over the second air interface when the number of candidate cells over the first interface is less than a predetermined minimum number for a predetermined period of time.

2. A method according to claim 1, wherein one of the first and second air interfaces comprises a TDMA air interface, and the other comprises a CDMA air interface.

3. A method according to claim 2, wherein while the mobile station is camped on the cell associated with the base station operating over the CDMA air interface, it performs idle mode procedures generally in accordance with a GSM standard.

4. A method according to claim 1, wherein receiving the signals over the second air interface comprises receiving signals using a single radio transceiver in the mobile station which is also used to receive the signals over the first air interface.

5. A method according to claim 4, wherein receiving the signals comprises receiving signals in either a GSM or a CDMA signaling mode.

6. A method according to claim 1, wherein the indication comprises a message broadcast to the mobile station over the first air interface that cells are available over the second air interface.

7. A method according to claim 1, wherein initiating the monitoring comprises initiating monitoring upon expiration of a predetermined time period during which monitoring over the second air interface has not occurred.

8. A method according to claim 1, wherein evaluating the characteristic comprises comparing the signals received from the second base station to signals received over the first air interface from the first base station and applying reselection criteria to the received signals so as to determine whether to select the second base station.

9. A method according to claim 1, wherein evaluating the characteristic comprises comparing power levels of the signals received over the first and second air interfaces.

10. A method according to claim 1, wherein evaluating the characteristic comprises comparing pathless criteria derived from the signals received over the first and second air interfaces.

11. A method according to claim 1, wherein selecting the second base station comprises receiving information broadcast over the first air interface in relation to criteria for interface reselection., and selecting the second base station responsive to the broadcast information.

12. A method according to claim 1, wherein selecting the second base station comprises storing information in a memory module of the mobile station in relation to criteria for interface reselection, and selecting the second base station responsive to the stored information.

13. In a mobile wireless telecommunications system, which includes a first cell associated with a first air interface of a first type, and a second cell associated with a second air interface of a second type, a mobile station, comprising:

at least one radio transceiver, which receives signals from the first and second cells over the first and second air interfaces, respectively; and control circuitry, which processes the signal received from the second cell while the mobile station is camped in idle mode on the first cell, and which evaluates the second signal and, responsive thereto, directs the mobile station to reselect and camp on the second cell, wherein the control circuitry initiates monitoring of signals over the second air interface responsive to an indication that a predetermined monitoring criterion has been met, and: and wherein the transceiver is tuned to receive signals from a plurality of candidate cells over the first air interface, and wherein the control circuitry initiates monitoring over the second air interface when the number of candidate cells over the first interface is less than a predetermined minimum number.

14. A mobile station according to claim 13, wherein the at least one transceiver comprises a single radio transceiver capable of operating over either the first of the second air interface.

15. A mobile station according to claim 14, wherein while the mobile station is camped on the first cell, the transceiver is activated intermittently to receive signals there front, and wherein the control circuitry operates the transceiver to seek and receive signals over the second air interface during sleep periods of the transceiver intermediate the periods during which it is activated to receive the signals from the first cell.

16. A mobile station according to claim 13, wherein one of the first and second air interfaces comprises a TDMA air interface, and the other comprises a CDMA air interface.

17. A mobile station according to claim 16, wherein while the mobile station camps on the cell associated with the CDMA air interface, the control circuitry performs idle mode procedures generally in accordance with a GSM standard.

18. A mobile station according to claim 13, wherein the indication comprises a message broadcast to the mobile station over the first air interface that cells are available over the second air interface.

19. In a mobile wireless telecommunications system, a method for cell reselection by a mobile station camped on a first cell associated with a first air interface of a first type, comprising:
   receiving signals over the air from a second cell associated with a second air interface of a second type;
   determining whether the second cell belongs to a different location area from the first cell;
   evaluating a characteristic of the signals, responsive to the determined location area of the second cell;
   responsive to the evaluation, selecting the second cell for camping in place of the first cell, and
   wherein determining whether the second cell belongs to a different location area comprises receiving a broadcast from the first cell indicating the location area of the second cell.

20. A method according to claim 19, wherein evaluating the characteristic of the signals comprises applying a threshold criterion to the signals, such the threshold for reselection is higher when the second cell belongs to a different location area front the first cell that when it belongs to the same location area.

21. In a mobile wireless telecommunications system, a mobile station, comprising:
   a radio transceiver, which receives signals from a second cell associated with a second air interface of a second type while the mobile station is camped on a first cell associated with a first air interface of a first type;
   control circuitry, which determines whether the second cell belong to a different location area from the first cell and processes the signals received from the second cell responsive to the determined location area of the second cell, so as to decide whether to select the second cell for camping in place of the first cell, and
   wherein the mobile station comprises a memory, in which a record of the location area of the second cell is stored.

22. A mobile station according to claim 21, wherein the processing circuitry applies a threshold criterion to the signals, such the threshold for reselection is higher when the second cell belongs to a different location area from the first cell that when it belongs to the same location area.

23. A mobile station according to claim 21, wherein the radio transceiver receives a broadcast from the first cell indicating the location area of the second cell.

* * * * *